United States Patent
Wu et al.

(10) Patent No.: US 11,246,056 B2
(45) Date of Patent: Feb. 8, 2022

(54) PACKET SENDING METHOD, APPARATUS, AND DEVICE

(71) Applicant: HUAWEI TECHNOLOGIES CO., LTD., Guangdong (CN)

(72) Inventors: Yuefeng Wu, Nanjing (CN); Yifan Wu, Nanjing (CN); Jian Hu, Nanjing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 248 days.

(21) Appl. No.: 16/695,473

(22) Filed: Nov. 26, 2019

(65) Prior Publication Data
US 2020/0100138 A1   Mar. 26, 2020

Related U.S. Application Data

(63) Continuation of application No. PCT/CN2018/074470, filed on Jan. 29, 2018.

(30) Foreign Application Priority Data

May 27, 2017  (CN) .......................... 201710393670.8

(51) Int. Cl.
*H04W 28/02* (2009.01)
*H04L 1/18* (2006.01)
(Continued)

(52) U.S. Cl.
CPC ....... *H04W 28/0294* (2013.01); *H04L 1/1621* (2013.01); *H04L 1/1848* (2013.01);
(Continued)

(58) Field of Classification Search
CPC ....... H04L 1/1848; H04L 1/16; H04L 1/1621; H04L 1/1858; H04L 47/14; H04L 47/34;
(Continued)

(56) References Cited

U.S. PATENT DOCUMENTS

2003/0179742 A1*  9/2003  Ogier ................. H04L 1/1887
                                                    370/351
2004/0213231 A1   10/2004  Cho et al.
(Continued)

FOREIGN PATENT DOCUMENTS

CN       101461181 A     6/2009
CN       101897139 A     11/2010
(Continued)

OTHER PUBLICATIONS

XP010910575 Haejun Lee et al.,"A Hop-by-hop Reliability Support Scheme for Wireless Sensor Networks", Proceedings of the Fourth Annual IEEE International Confierence on Pervasive Computing and Communications Workshops (PERGOMW"06},dated 2006,total 6 pages.
(Continued)

*Primary Examiner* — Redentor Pasia
(74) *Attorney, Agent, or Firm* — Womble Bond Dickinson (US) LLP

(57) ABSTRACT

A packet sending method includes: receiving, by a first node, a first broadcast data packet sent by a second node; and if a sequence number of the first broadcast data packet equals 1 plus a sequence number of a latest data packet saved by the first node, and the first node does not receive, within a first preset time period, a first acknowledgement indication for the first broadcast data packet of the second node, sending, by the first node, a first broadcast acknowledgement packet when the first preset time period elapses, where the first broadcast acknowledgement packet includes the first acknowledgement indication, and the first acknowledgement indication includes the sequence number of the first broadcast data packet and an address of the second node. This method could resolve acknowledgement packet implo-
(Continued)

sion while ensuring broadcast packet reliability of a wireless mesh network.

20 Claims, 13 Drawing Sheets

(51) Int. Cl.
*H04L 12/801* (2013.01)
*H04L 1/16* (2006.01)
*H04W 84/18* (2009.01)

(52) U.S. Cl.
CPC ............ *H04L 1/1858* (2013.01); *H04L 47/14* (2013.01); *H04L 47/34* (2013.01); *H04W 84/18* (2013.01)

(58) Field of Classification Search
CPC ........... H04W 28/021; H04W 28/0294; H04W 40/022; H04W 40/023
See application file for complete search history.

(56) References Cited

U.S. PATENT DOCUMENTS

| | | | |
|---|---|---|---|
| 2006/0187874 A1* | 8/2006 | Zaki | .................... H04L 47/2483 370/328 |
| 2007/0258466 A1 | 11/2007 | Kakani | |
| 2009/0201928 A1 | 8/2009 | Chen et al. | |
| 2010/0157888 A1 | 6/2010 | Aggarwal et al. | |
| 2010/0254392 A1 | 10/2010 | Katar et al. | |
| 2013/0094429 A1 | 4/2013 | Seok | |
| 2014/0086222 A1 | 3/2014 | Bao et al. | |
| 2016/0028452 A1* | 1/2016 | Chu | ...................... H04L 5/0055 375/267 |
| 2016/0080115 A1* | 3/2016 | Josiam | .................. H04L 1/1854 370/329 |
| 2016/0373338 A1 | 12/2016 | Suzuki | |
| 2017/0373813 A1* | 12/2017 | Asterjadhi | ............. H04W 28/06 |
| 2019/0075491 A1* | 3/2019 | Ahn | ...................... H04L 5/0091 |
| 2020/0177350 A1* | 6/2020 | Uhling | .................. H04L 1/1621 |

FOREIGN PATENT DOCUMENTS

| | | |
|---|---|---|
| CN | 102369521 A | 3/2012 |
| CN | 102684852 A | 9/2012 |
| CN | 102802166 A | 11/2012 |
| CN | 103554973 A | 1/2014 |
| CN | 104349418 A | 2/2015 |
| CN | 104378290 A | 2/2015 |

OTHER PUBLICATIONS

XP001578255 Woongsoo NA et al.,"Reliable Broadcast Scheme for IEEE 802.15.5 Low-Rate WPAN Mesh Networks", IEICE Trans. Commun . . . vol. E95-B, N0.Sep. 9, 2012,total 8 pages.

* cited by examiner

PACKET SENDING METHOD, APPARATUS, AND DEVICE

CROSS-REFERENCE TO RELATED APPLICATIONS

This application is a continuation of International Application No. PCT/CN2018/074470, filed on Jan. 29, 2018, which claims priority to Chinese Patent Application No. 201710393670.8, filed on May 27, 2017. The disclosures of the aforementioned applications are hereby incorporated by reference in their entireties.

TECHNICAL FIELD

This application relates to the field of communications technologies, and in particular, to a packet sending method, apparatus, and device.

BACKGROUND

In a wireless communications network, a wireless mesh network is introduced to resolve a problem that a wireless signal is transmitted in a short distance and has a small coverage area. In the wireless mesh network, wireless device nodes, which may simply be referred to as nodes, are connected to other neighboring nodes in a wireless multi-hop manner, to form a multi-hop mesh network. A routing- and forwarding-capable node is referred to as a routing node and may be used as a relay of another node, to forward data for the another node. In this way, the node in the mesh network can communicate with another node outside a coverage area of a wireless signal of the node, so that the coverage area of the wireless signal is expanded.

However, when a broadcast packet is sent in the mesh network, the broadcast packet usually does not require a receiving node to respond; and therefore, a sending node neither knows whether the receiving node receives the packet or not, nor retransmits the packet. As a result, reliability of the broadcast packet cannot be ensured for the sending node.

To resolve a problem of broadcasting reliability, researchers propose a selective acknowledgement and dual coverage technology. In this technology, nodes are classified into non-forwarding nodes and forwarding nodes based on a particular algorithm, a forwarding node set that includes one-hop neighboring nodes is calculated for each forwarding node, and the set is referred to as a sending set. After receiving a packet sent by a sending node, the nodes in the sending set each need to send a unicast acknowledgement packet, and a node in a non-sending set does not need to send an acknowledgement packet. In this way, if the sending node does not receive unicast acknowledgement packets sent by all the nodes in the sending set of the sending node, the sending node needs to retransmit the broadcast packet. Therefore, the technology improves broadcast packet reliability of the wireless mesh network. However, it should be noted that all the nodes in the sending set need to send a unicast acknowledgement packet when receiving a broadcast packet. In this case, a large quantity of acknowledgement packets are generated in the network within a quite short time period, and an acknowledgement packet collision may be caused. This consequently results in loss of acknowledgement packets, waste of a great deal of network resources, and acknowledgement packet implosion. Therefore, when broadcast packet reliability of the wireless mesh network is ensured, acknowledgement packet implosion becomes a problem that needs to be urgently resolved.

SUMMARY

This application provides a packet sending method, apparatus, and device, so as to resolve acknowledgement packet implosion while ensuring broadcast packet reliability of a wireless mesh network.

According to a first aspect, a packet sending method is provided, specifically including: receiving, by a first node, a first broadcast data packet sent by a second node; and sending, by the first node, a first broadcast acknowledgement packet only in a case in which a sequence number of the first broadcast data packet equals 1 plus a sequence number of a latest data packet saved by the first node, which indicates that the first broadcast data packet is a new data packet received by the first node, and in addition, in such a case the first node does not receive, within a first preset time period, a first acknowledgement indication for the first broadcast data packet of the second node, which indicates that no other nodes confirm reception of the first broadcast data packet to the second node. Therefore, repeated acknowledgement for the first broadcast data packet of the second node can be avoided, thereby avoiding acknowledgement frame implosion.

The first broadcast acknowledgement packet includes the first acknowledgement indication, and the first acknowledgement indication includes the sequence number of the first broadcast data packet and an address of the second node. The first acknowledgement indication may be included in a broadcast packet whose packet type is a data packet, or may be included in a broadcast packet whose packet type is an acknowledgement packet.

In one embodiment, if the first node has a subnode, the first node probably needs to forward the first broadcast data packet. In this case, the first node starts a first timer and a second timer, and the first node determines, within timing duration of the second timer, whether to forward the first broadcast data packet. The timing duration of the second timer is shorter than timing duration of the first timer.

It should be noted that the first broadcast data packet to be forwarded by the first node carries an acknowledgement indication for the second node. Therefore, if the first node forwards the first broadcast data packet, the first broadcast acknowledgement packet for the second node is no longer to be sent, and the first node may stop timing of the first timer. If the first node determines, within the timing duration of the second timer, to skip forwarding the first broadcast data packet, the first node still needs to determine, within remaining timing duration of the first timer, whether the first broadcast acknowledgement packet for the second node needs to be sent.

Therefore, when the first node forwards the first broadcast data packet, the first node no longer needs to forward the first broadcast acknowledgement packet, thereby further reducing cases in which an acknowledgement packet needs to be sent and helping avoid acknowledgement packet implosion.

In one embodiment, the timing duration of the second timer is set to be inversely proportional to a quantity of subnodes of the first node. A larger quantity of subnodes means a higher probability that the first node needs to forward the first broadcast data packet; therefore, setting the timing duration of the second timer to be inversely proportional to the quantity of subnodes helps improve efficiency of forwarding the first broadcast data packet.

In one embodiment, if the first node receives, within timing duration of a second timer, an acknowledgement indication, sent by any one subnode for the first broadcast data packet, the first broadcast data packet is not to be forwarded. If the first node does not receive an acknowledgement indication, sent by any one subnode for the first broadcast data packet, the first broadcast data packet is to be forwarded. This prevents the first broadcast data packet from being repeatedly forwarded, thereby avoiding a broadcast storm.

In one embodiment, if the first node forwards the first broadcast data packet, the first node starts a third timer and determines, when timing duration of the third timer elapses, whether to retransmit the first broadcast data packet. Therefore, the first node delays forwarding the first broadcast data packet, and the first node no longer retransmits the first broadcast data packet when receiving an acknowledgement indication, from any one subnode for the first broadcast data packet, thereby effectively avoiding a broadcast storm. A retransmission mechanism is further introduced after the first node forwards the first broadcast data packet, thereby improving reliability of forwarding the first broadcast data packet.

In one embodiment, if a sequence number of the first broadcast data packet equals a sequence number of a latest data packet saved by the first node, and the first broadcast data packet carries an address of the first node, the first node determines to skip retransmitting the first broadcast data packet. If a sequence number of the first broadcast data packet equals a sequence number of a latest data packet saved by the first node, and the first broadcast data packet carries an address of a parent node of the first node, the first node determines to skip sending an acknowledgement packet. This further breaks down cases for canceling sending an acknowledgement indication and performing retransmission, thereby avoiding acknowledgement frame implosion and improving data packet transmission reliability of the first node.

In one embodiment, if a sequence number of the first broadcast data packet is greater than 1 plus a sequence number of a latest data packet saved by the first node, the first node determines a first missing data packet and starts a fourth timer. If the first node does not receive the first missing data packet within timing duration of the fourth timer, the first node sends a negative acknowledgement indication to a parent node, so as to instruct the parent node to send the first missing data packet.

A sequence number of the first missing data packet is a sequence number between 1 plus the sequence number of the latest data packet saved by the first node and the sequence number of the first broadcast data packet.

Therefore, the first missing data packet of the first node is further determined based on the sequence number of the received first broadcast data packet, and the negative acknowledgement indication is sent, so that the parent node sends the first missing data packet. In this way, reliability of sending the first broadcast data packet by the first node is further improved.

In one embodiment, it is assumed that the first node receives a third broadcast acknowledgement packet, where the third broadcast acknowledgement packet includes a sequence number of a third broadcast data packet and an address of a sending node of the third broadcast data packet.

If the third broadcast acknowledgement packet is used as an acknowledgement to the first node, the first node determines to skip retransmitting the third broadcast data packet.

If the third broadcast acknowledgement packet is used as an acknowledgement to a parent node of the first node, the sequence number of the third broadcast data packet is further compared with the sequence number of the latest data packet saved by the first node.

If the sequence number of the third broadcast data packet equals the sequence number of the latest data packet saved by the first node, the first node determines to skip sending the third broadcast acknowledgement packet.

If the sequence number carried in the third broadcast data packet is greater than the sequence number of the latest data packet saved by the first node, the first node determines a second missing data packet, starts a fifth timer, and determines, within timing duration of the fifth timer, whether to send a second negative acknowledgement indication to the parent node. A sequence number of the second missing data packet is a data packet sequence number between 1 plus the sequence number of the latest data packet saved by the first node and the sequence number of the third broadcast data packet.

Therefore, when the first node receives a broadcast acknowledgement packet, according to this application, with the foregoing series of processing, reliability of forwarding a data packet by the first node can be improved, and an acknowledgement frame storm can also be avoided.

According to a second aspect, a packet sending apparatus is provided, including a receiving unit, configured to receive a first broadcast data packet sent by a second node; and a sending unit, configured to: if a sequence number of the first broadcast data packet received by the receiving unit equals 1 plus a sequence number of a latest data packet saved by a first node, and the receiving unit does not receive, within a first preset time period, a first acknowledgement indication for the first broadcast data packet of the second node, send a first broadcast acknowledgement packet when the first preset time period elapses, where the first broadcast acknowledgement packet includes the first acknowledgement indication, and the first acknowledgement indication includes the sequence number of the first broadcast data packet and an address of the second node.

In one embodiment, the apparatus further includes a processing unit, configured to start a first timer and a second timer if the first node has a subnode, where timing duration of the first timer is the first preset time period, timing duration of the second timer is a second preset time period, and the second preset time period is less than the first preset time period.

The sending unit is configured to: if the receiving unit does not receive, within the second preset time period, a second acknowledgement indication, sent by any one subnode of the first node for the first broadcast data packet, send the first broadcast data packet when the second preset time period elapses.

In one embodiment, the second preset time period is inversely proportional to a quantity of subnodes of the first node.

In one embodiment, the processing unit is further configured to start a third timer when the sending unit sends the first broadcast data packet, where timing duration of the third timer is a third preset time period, and the third preset time period is greater than the first preset time period; and the sending unit is further configured to: if the receiving unit does not receive, within the third preset time period, a third acknowledgement indication for the first broadcast data packet of the first node, retransmit the first broadcast data packet when the third preset time period elapses.

In one embodiment, the processing unit is further configured to determine that the receiving unit does not receive, within the first preset time period, at least one of a second broadcast data packet and a second broadcast acknowledgement packet, where the second broadcast data packet includes a data field and the first acknowledgement indication, and the second broadcast acknowledgement packet includes the first acknowledgement indication.

In one embodiment, the processing unit is further configured to: if a sequence number of the first broadcast data packet equals a sequence number of a latest data packet saved by the first node, and the first broadcast data packet carries an address of the first node, determine to skip retransmitting the first broadcast data packet; or the processing unit is further configured to: if a sequence number of the first broadcast data packet equals a sequence number of a latest data packet saved by the first node, and the first broadcast data packet carries an address of a parent node of the first node, determine to skip sending the first broadcast acknowledgement packet.

In one embodiment, the processing unit is further configured to: if a sequence number of the first broadcast data packet is greater than 1 plus a sequence number of a latest data packet saved by the first node, determine that a data packet whose sequence number is between 1 plus the sequence number of the latest data packet saved by the first node and the sequence number of the first broadcast data packet is a first missing data packet, and start a fourth timer, where timing duration of the fourth timer is a fourth preset time period.

The sending unit is further configured to: if the receiving unit does not receive the first missing data packet within the fourth preset time period, send a first negative acknowledgement indication to a parent node of the first node, where the first negative acknowledgement indication includes the sequence number of the first missing data packet, so as to instruct the parent node of the first node to send the first missing data packet.

In one embodiment, the receiving unit is further configured to receive a third broadcast acknowledgement packet sent by the second node, where the third broadcast acknowledgement packet includes a sequence number of a third broadcast data packet and an address of a sending node of the third broadcast data packet.

The processing unit is further configured to: if the third broadcast acknowledgement packet is used as an acknowledgement to the first node, determine to skip retransmitting the third broadcast data packet.

In another embodiment, the processing unit is further configured to: if the third broadcast acknowledgement packet is used as an acknowledgement to a parent node of the first node, compare the sequence number of the third broadcast data packet with the sequence number of the latest data packet saved by the first node.

The processing unit is further configured to: if the sequence number of the third broadcast data packet equals the sequence number of the latest data packet saved by the first node, determine to skip sending the third broadcast acknowledgement packet.

In another embodiment, the processing unit is further configured to: if the sequence number of the third broadcast data packet is greater than the sequence number of the latest data packet saved by the first node, determine that a data packet whose sequence number is between 1 plus the sequence number of the latest data packet saved by the first node and the sequence number of the third broadcast data packet is a second missing data packet, and start a fifth timer, where timing duration of the fifth timer is a fifth preset time period.

The sending unit is further configured to: if the receiving unit does not receive the second missing data packet within the fifth preset time period, send a second negative acknowledgement indication to the parent node of the first node, where the second negative acknowledgement indication includes the sequence number of the second missing data packet, so as to instruct the parent node of the first node to send the second missing data packet.

According to a third aspect, a packet sending device is provided, including a processor and a transceiver. The transceiver is configured to receive a first broadcast data packet sent by a second node; and the transceiver is further configured to: if a sequence number of the first broadcast data packet received by the transceiver equals 1 plus a sequence number of a latest data packet saved by a first node, and the transceiver does not receive, within a first preset time period, a first acknowledgement indication for the first broadcast data packet of the second node, send a first broadcast acknowledgement packet when the first preset time period elapses, where the first broadcast acknowledgement packet includes the first acknowledgement indication, and the first acknowledgement indication includes the sequence number of the first broadcast data packet and an address of the second node.

In one embodiment, the processor, configured to start a first timer and a second timer if the first node has a subnode, where timing duration of the first timer is the first preset time period, timing duration of the second timer is a second preset time period, and the second preset time period is less than the first preset time period.

The transceiver is configured to: if the transceiver does not receive, within the second preset time period, a second acknowledgement indication, sent by any one subnode of the first node for the first broadcast data packet, send the first broadcast data packet when the second preset time period elapses.

In one embodiment, the second preset time period is inversely proportional to a quantity of subnodes of the first node.

In one embodiment, the processor is further configured to start a third timer when the transceiver sends the first broadcast data packet, where timing duration of the third timer is a third preset time period, and the third preset time period is greater than the first preset time period; and the transceiver is further configured to: if the transceiver does not receive, within the third preset time period, a third acknowledgement indication for the first broadcast data packet of the first node, retransmit the first broadcast data packet when the third preset time period elapses.

In one embodiment, the processor is further configured to determine that the transceiver does not receive, within the first preset time period, at least one of a second broadcast data packet and a second broadcast acknowledgement packet, where the second broadcast data packet includes a data field and the first acknowledgement indication, and the second broadcast acknowledgement packet includes the first acknowledgement indication.

In one embodiment, the processor is further configured to: if a sequence number of the first broadcast data packet equals a sequence number of a latest data packet saved by the first node, and the first broadcast data packet carries an address of the first node, determine to skip retransmitting the first broadcast data packet; or the processor is further configured to: if a sequence number of the first broadcast data packet equals a sequence number of a latest data packet saved by the first node, and the first broadcast data packet carries an address of a parent node of the first node, determine to skip sending the first broadcast acknowledgement packet.

In one embodiment, the processor is further configured to: if a sequence number of the first broadcast data packet is greater than 1 plus a sequence number of a latest data packet saved by the first node, determine that a data packet whose sequence number is between 1 plus the sequence number of the latest data packet saved by the first node and the sequence number of the first broadcast data packet is a first missing data packet, and start a fourth timer, where timing duration of the fourth timer is a fourth preset time period.

The transceiver is further configured to: if the transceiver does not receive the first missing data packet within the fourth preset time period, send a first negative acknowledgement indication to a parent node of the first node, where the first negative acknowledgement indication includes the sequence number of the first missing data packet, so as to instruct the parent node of the first node to send the first missing data packet.

In one embodiment, the transceiver is further configured to receive a third broadcast acknowledgement packet sent by the second node, where the third broadcast acknowledgement packet includes a sequence number of a third broadcast data packet and an address of a sending node of the third broadcast data packet.

The processor is further configured to: if the third broadcast acknowledgement packet is used as an acknowledgement to the first node, determine to skip retransmitting the third broadcast data packet.

In another embodiment, the processor is further configured to: if the third broadcast acknowledgement packet is used as an acknowledgement to a parent node of the first node, compare the sequence number of the third broadcast data packet with the sequence number of the latest data packet saved by the first node.

The processor is further configured to: if the sequence number of the third broadcast data packet equals the sequence number of the latest data packet saved by the first node, determine to skip sending the third broadcast acknowledgement packet; or if the sequence number of the third broadcast data packet is greater than the sequence number of the latest data packet saved by the first node, determine that a data packet whose sequence number is between 1 plus the sequence number of the latest data packet saved by the first node and the sequence number of the third broadcast data packet is a second missing data packet, and start a fifth timer, where timing duration of the fifth timer is a fifth preset time period.

The transceiver is further configured to: if the transceiver does not receive the second missing data packet within the fifth preset time period, send a second negative acknowledgement indication to the parent node of the first node, where the second negative acknowledgement indication includes the sequence number of the second missing data packet, so as to instruct the parent node of the first node to send the second missing data packet.

According to a fourth aspect, a computer storage medium is provided. The computer storage medium is configured to store a computer software instruction used by the foregoing network device and the computer software instruction includes a program that is designed for executing the foregoing aspects.

According to a fifth aspect, a computer program product including an instruction is provided. When the product runs on a computer, the computer performs the methods described in the foregoing aspects.

DESCRIPTION OF EMBODIMENTS

The following clearly describes the technical solutions in the embodiments of this application with reference to the accompanying drawings in the embodiments of this application.

Figure 1:
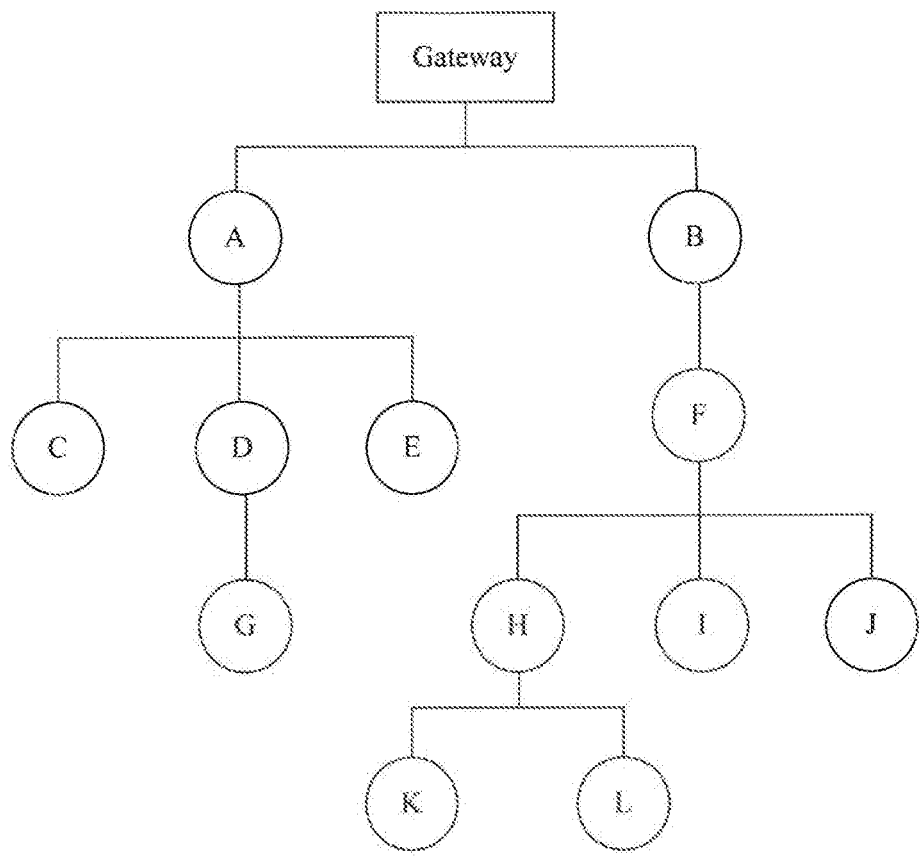
FIG. 1 is a schematic diagram of a topology of a wireless mesh network according to an embodiment of this application.

The embodiments of this application are applicable to a network in a tree structure and a mesh network structure, and a mesh network is used as an example for description in the embodiments of this application. FIG. 1 shows a topology of a mesh network. The wireless mesh network consists of a gateway device and a lot of nodes. Specifically, the gateway device communicates with a plurality of first-level nodes, each first-level node may communicate with a plurality of second-level nodes, and so on. For example, the first-level nodes are A and B in FIG. 1, the second-level nodes are C, D, E, and F in FIG. 1, and so on. An $(n-1)^{th}$ level node connected to an $n^{th}$ level node is referred to as a parent node of the $n^{th}$ level node, and the $n^{th}$ level node is referred to as a subnode of the $(n-1)^{th}$ level node. For example, in FIG. 1, A is a parent node of C, D, and E, and C, D, and E are subnodes of A. The $n^{th}$ level nodes that have a same parent node are neighboring nodes to each other. For example, in FIG. 1, C, D, and E are neighboring nodes to each other. Nodes directly connected to a node usually include a parent node, a subnode, and a neighboring node of the node. For example, in FIG. 1, nodes directly connected to D include A, G, C, and E.

It should be noted that, FIG. 1 shows only one gateway device; however, a quantity of gateway devices, a quantity of nodes, a specific connection manner between a gateway device and a node, and a specific connection manner between nodes are not limited in the embodiments of this application.

In the wireless mesh network, the gateway device usually uses broadcasting when notification over the entire network or version upgrading is required. In a packet broadcasting process, the gateway device broadcasts a packet to a first-level node, the first-level node forwards the packet to a second-level node that is connected to the first-level node, and so on, until the packet is transmitted throughout the entire network. To ensure reliability of packet transmission, a node that receives the packet needs to send an acknowledgement (ACK) packet in a unicast manner. In this case, a problem occurs: Both a source node and an intermediate node forward a packet through broadcasting, and therefore many nodes receive the packet and a large quantity of acknowledgement packets are generated in the network within a quite short time period. This may cause an acknowledgement packet collision, and lead to acknowledgement packet implosion. However, if a method in the embodiments of this application is used, reliability of packet broadcasting is ensured, and a quantity of acknowledgement packets is greatly decreased, thereby avoiding acknowledgement packet implosion.

It should be noted that the method in the embodiments of this application may be further applied to another data transmission manner such as a multicast manner. A specific data transmission manner is not limited in the embodiments of this application.

For clearer understanding of various packet types used in the embodiments of this application, various packet types are first described with reference to packet formats.

Figure 2:
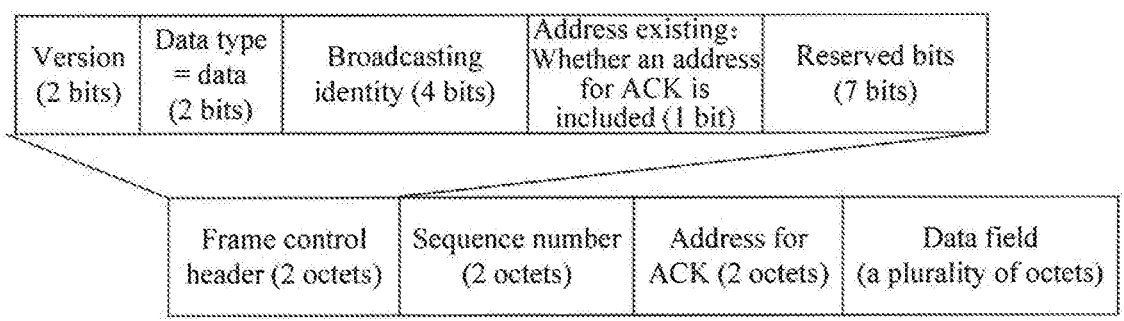
FIG. 2 is a schematic diagram of a format of a broadcast data packet according to an embodiment of this application.

FIG. 2 shows a format of a broadcast data packet. It can be learned that one broadcast data packet includes a 2-octet frame control header, a 2-octet sequence number (SeqNo), a 2-octet address for acknowledgement, and a multi-octet data field. Further, the frame control header specifically includes a 2-bit version number, a 2-bit data type (DT), a 4-bit broadcasting identity (Brdcst ID), a 1-bit identifier that indicates whether an address for acknowledgement exists, and 7 reserved bits.

Specifically, meanings of the fields are as follows:

(1) Version is used to identify a protocol version number used for the frame control header.

(2) DT indicates a broadcast packet type. If a broadcast packet is a broadcast data packet, the broadcast packet of this type may support data transmission.

(3) Brdcst ID is used to identify a broadcast transaction type, for example, firmware upgrade, parameter configuration, and heartbeat may be identified by using different IDs.

(4) Address Existing is used to identify whether a broadcast data packet includes an address for acknowledgement, in other words, whether the broadcast data packet is also used as an acknowledgement to a sending node.

(6) SeqNo is used to distinguish different broadcast data packets and may be a sequence number of a broadcast data packet that carries the SeqNo.

(7) Address for ACK is used to indicate which sending node the broadcast data packet is used as an acknowledgement to when the broadcast data packet is used for sending data, and Address for ACK may be an address of the sending node, for example, may use a 16-bit short address identifier.

It can be learned that, when Address Existing indicates that a broadcast data packet includes an address for acknowledgement, when being used for transmitting data that needs to be broadcast, the broadcast data packet further needs to be used as an acknowledgement to the sending node, and a value in Address for ACK is used to indicate an address of the sending node.

Figure 3:
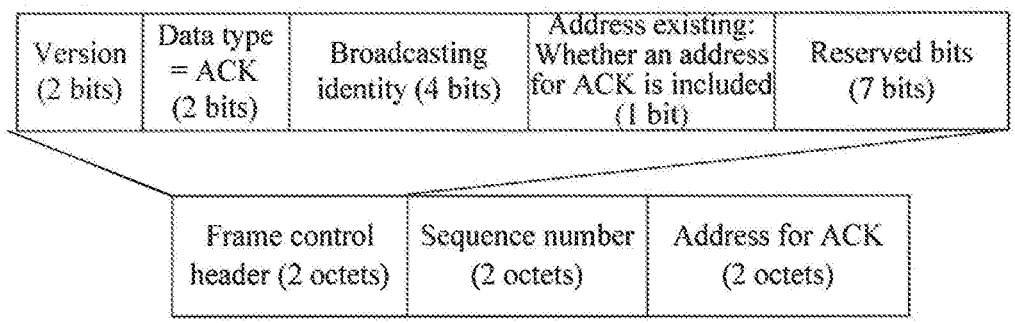
FIG. 3 is a schematic diagram of a format of a broadcast acknowledgement packet according to an embodiment of this application.

FIG. 3 shows a format of a broadcast acknowledgement packet which may also be referred to as a broadcast ACK packet. The broadcast ACK packet is used to confirm reception of a broadcast data packet that is sent by a sending node. Compared with the broadcast data packet, in format, the broadcast ACK packet does not have a data field, and other fields of the broadcast ACK packet are the same as those of the broadcast data packet. In content, in the broadcast ACK packet, if a packet type is indicated as ACK in DT in a frame control header, the packet is an acknowledgement packet. SeqNo identifies which data packet the broadcast ACK packet is used as an acknowledgement to. In other words, SeqNo is a sequence number of the data packet. Address for ACK identifies which sending node the broadcast ACK packet is used as an acknowledgement to. In other words, Address for ACK is an address of the sending node.

Figure 4:
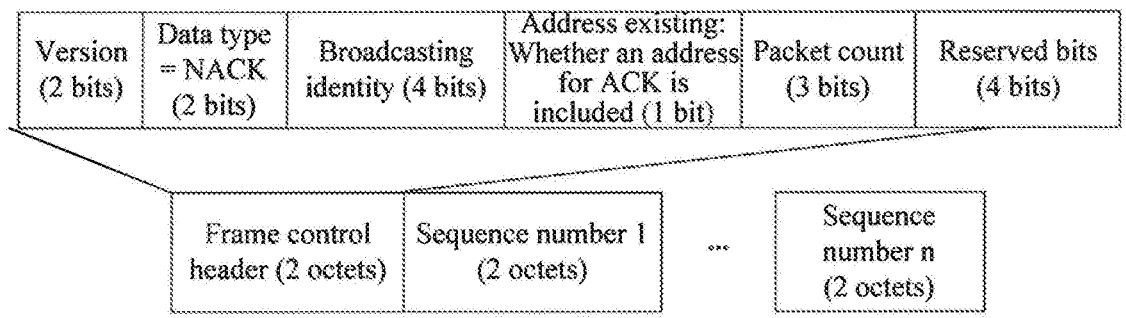
FIG. 4 is a schematic diagram of a format of a unicast negative acknowledgement packet according to an embodiment of this application.

FIG. 4 shows a format of a unicast negative acknowledgement (NACK) packet. The unicast NACK packet is used to request a missing data packet from a parent node. Compared with a broadcast data packet, in format, the unicast NACK packet does not have an Address for ACK field and a data field, and a SeqNo field of the unicast NACK packet may include a plurality of sequence numbers indicating sequence numbers of a plurality of missing data packets. In addition, a frame control header of the unicast NACK packet includes a 3-bit packet count (Pkt Count) identifier, and the identifier is used to indicate a quantity of missing data packets and also determines a quantity of sequence numbers in the SeqNo field. In content, in the frame control header of the unicast NACK packet, DT indicates that the packet is a NACK.

Figure 5:
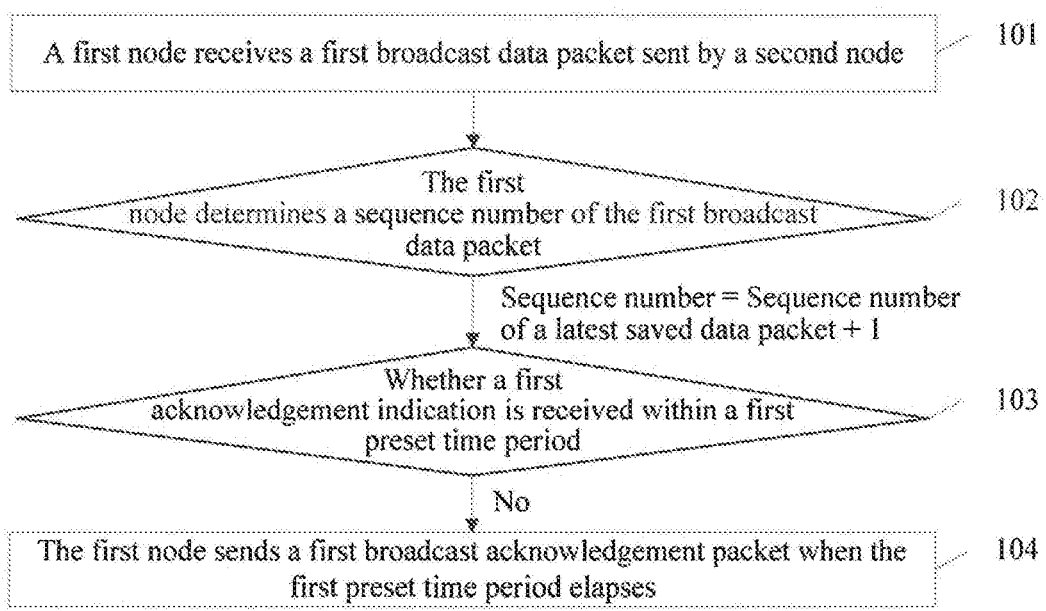
FIG. 5 is a flowchart of a packet sending method according to an embodiment of this application.

As shown in FIG. 5, an embodiment of this application provides a packet sending method. The packet sending method may be applied to a wireless mesh network shown in FIG. 1 and specifically includes the following operations.

Operation 101. A first node receives a first broadcast data packet sent by a second node.

The first node is any node. The second node may be a parent node of the first node, a neighboring node of the first node, or a subnode of the first node.

Specifically, a packet type may be determined by using a DT field in a frame control header of the packet. If a DT identifier is data, the packet may be determined as a data packet. If a DT identifier is ACK, the packet may be determined as an acknowledgement packet.

Operation 102. The first node determines a sequence number of the first broadcast data packet.

Specifically, if the first broadcast data packet is a broadcast data packet shown in FIG. 2, a SeqNo field in the first broadcast data packet is the sequence number of the first broadcast data packet. The obtained sequence number of the first broadcast data packet is compared with a sequence number of a latest data packet saved by the first node.

If the sequence number of the first broadcast data packet equals 1 plus the sequence number of the latest data packet saved by the first node, the first broadcast data packet is a data packet newly received by the node, and operation 103 is performed. If the sequence number of the first broadcast data packet equals the sequence number of the latest data packet saved by the first node, it indicates that the first node has previously received the first broadcast data packet, and operation 301 is performed. If the sequence number of the first broadcast data packet is greater than 1 plus the sequence number of the latest data packet saved by the first node, the first node may lose a data packet, and operation 401 is performed.

It should be noted that a quantity of data packets locally stored by each node is limited. Therefore, when the node receives a new data packet, the new data packet overwrites an earliest data packet stored by the node. For example, a node is capable of storing only five data packets, and has stored five data packets. It is assumed that the five stored data packets are successively No. 1, No. 2, No. 3, No. 4, and No. 5 in a storage time order. In this case, a latest data packet saved by the node is No. 5. When the node receives a No. 6 data packet, the node overwrites the No. 1 data packet with the No. 6 data packet. Then, a latest data packet saved by the node is No. 6.

In one embodiment, when saving a received new data packet, the node may also locally store a sequence number of the new data packet. In this way, when the node needs to use the sequence number of the data packet, the node may directly extract the sequence number for processing and no longer needs to parse the data packet. In addition, the node may also store field information of the first broadcast data packet, such as Address for ACK. This is not limited in this embodiment of this application herein.

Operation 103. The first node determines whether the first node receives, within a first preset time period, a first acknowledgement indication for the first broadcast data packet of the second node. If the first acknowledgement indication, sent by another node for the first broadcast data packet of the second node is not received within the first preset time period, operation 104 is performed.

The first acknowledgement indication includes the sequence number of the first broadcast data packet and an address of the second node. A packet including the first acknowledgement indication is at least one of a second broadcast data packet and a second broadcast acknowledgement packet. Specifically, if the second broadcast data packet is a broadcast data packet shown in FIG. 2, a SeqNo field in the second broadcast data packet is the same as the sequence number of the first broadcast data packet, and an Address for ACK field is the address of the second node. In addition, content of a data field in the second broadcast data packet is the same as content of a data field in the first broadcast data packet. For example, the second broadcast data packet may be the first broadcast data packet that is forwarded by another node and that is sent by the second node. In addition, the packet is used to confirm, to the second node, reception of the first broadcast data packet of the second node. If the second broadcast data packet is a broadcast ACK packet shown in FIG. 3, a SeqNo field in the second broadcast acknowledgement packet is the same as the sequence number of the first broadcast data packet, and an Address for ACK field is the address of the second node. For example, the second broadcast acknowledgement packet may be used by another node to confirm, to the second node, reception of the first broadcast data packet sent by the second node.

In one embodiment, the second node may have a plurality of subnodes, a subnode that receives the first broadcast data packet sent by the second node performs acknowledgement. As a result, an acknowledgement packet collision may be caused and resources may be wasted. To avoid this case, in this embodiment of this application, all nodes are required to start a first timer after receiving the first broadcast data packet. Timing duration of the first timer is the first preset time period. When the first preset time period elapses, the nodes each randomly select a time point to send an acknowledgement to the second node. Occasions on which the plurality of subnodes send the acknowledgements may be different. For example, the first preset time period may be set to 100 ms. In this way, a subnode that receives the first broadcast data packet performs acknowledgement at any time after 100 ms upon reception of the first broadcast data packet.

Further, if the first node receives, within the first preset time period, the first acknowledgement indication, sent by another node for the first broadcast data packet of the second node, it indicates that another node performs acknowledgement to the second node for the received first broadcast data packet, and the first node no longer needs to perform acknowledgement to the second node for the first broadcast data packet. The first acknowledgement indication herein may be included in the foregoing second broadcast data packet or may be included in the second broadcast acknowledgement packet. In this way, cases in which neighboring nodes of the first node perform acknowledgement to a same sending node for a same packet can further be reduced, thereby mitigating acknowledgement packet implosion.

Operation 104. The first node sends a first broadcast acknowledgement packet when the first preset time period elapses.

The first broadcast acknowledgement packet includes the first acknowledgement indication. Details are not described herein again.

In the packet sending method provided in this embodiment of this application, after the first node receives the first broadcast data packet sent by the second node, and when the first node determines that the first broadcast data packet is a data packet newly received by the first node, and the first node does not receive, within the first preset time period, the first acknowledgement indication for the first broadcast data packet of the second node, the first node sends the first broadcast acknowledgement packet that includes the first acknowledgement indication. In the prior art, all nodes that receive a first broadcast data packet need to send a unicast acknowledgement packet, and therefore a large quantity of acknowledgement packets are generated in a network within a short time period, thereby causing acknowledgement packet implosion. However, in this application, before sending the first broadcast acknowledgement packet that includes the first acknowledgement indication, a node first needs to determine whether the node receives a first acknowledgement indication sent by another node, if the node receives the first acknowledgement indication sent by the another node, the node no longer sends the first broadcast acknowledgement packet. This prevents neighboring nodes from repeatedly sending the first acknowledgement indication, avoids generating a large quantity of packets in a network within a short time period, and therefore avoids acknowledgement packet implosion.

Figure 6:
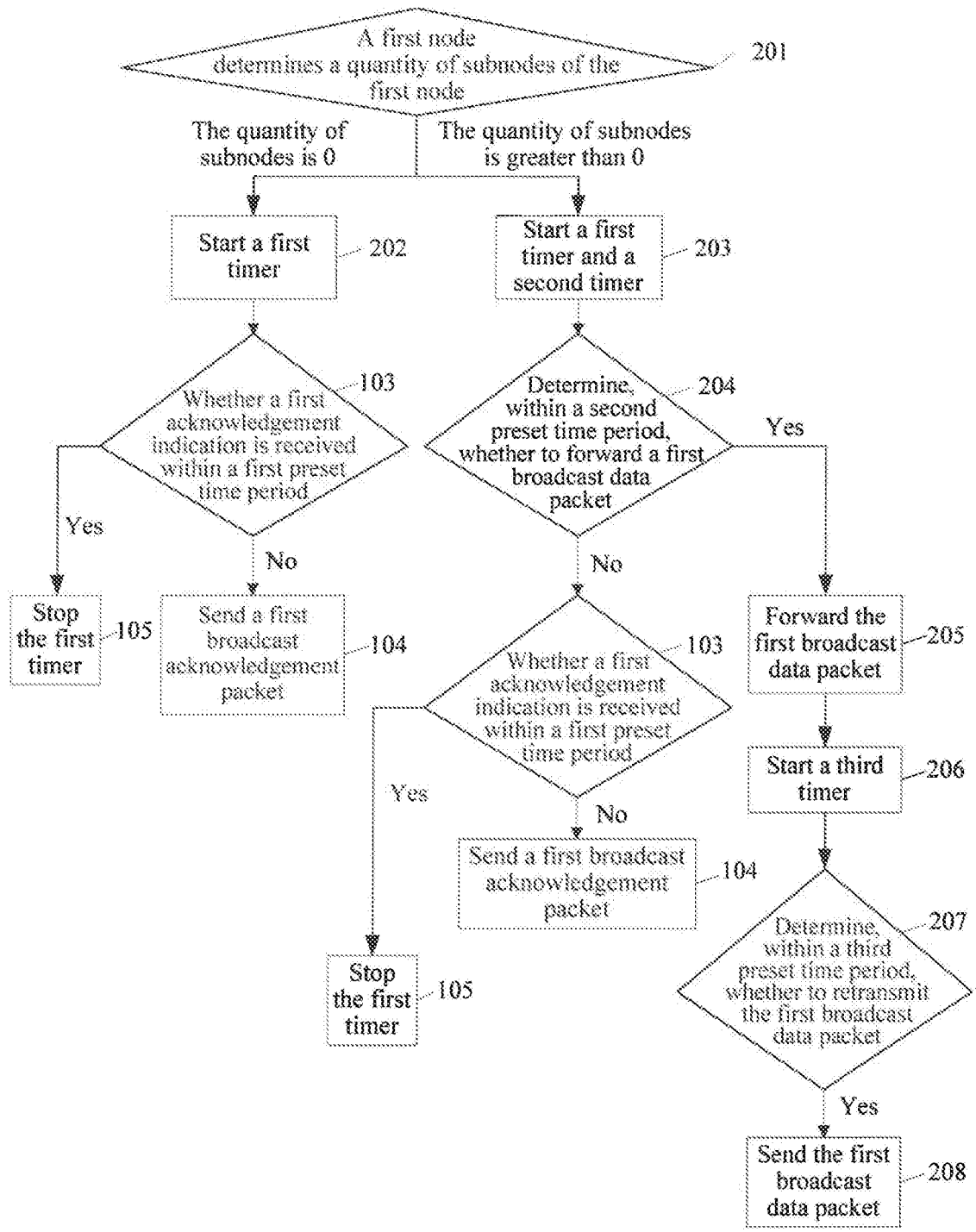
FIG. 6 is a flowchart of another packet sending method according to an embodiment of this application.

Further, before operation 103, as shown in FIG. 6, a packet sending method provided in an embodiment of this application further includes operations of forwarding the first broadcast data packet. The following operations are specifically included.

Operation 201. The first node determines a quantity of subnodes of the first node.

Specifically, the first node delays, depending on the quantity of subnodes of the first node, forwarding the first broadcast data packet in different cases. Optionally, if the quantity of subnodes of the first node is 0, the first broadcast data packet does not need to be forwarded, and operation 202 is directly performed. If the first node determines that the quantity of subnodes of the first node is greater than 0, forwarding of the first broadcast data packet is delayed according to a given rule, and operation 203 is performed.

Operation 202. The first node starts a first timer, and then performs operation 103.

Timing duration of the first timer is a first preset time period, and the first node determines whether a first acknowledgement indication is received within the first preset time period. If the first acknowledgement indication is not received, operation 104 in which the first node sends a first broadcast acknowledgement packet is performed. If the first acknowledgement indication is received, operation 105 is performed. That is, timing of the first timer is stopped. Then, the first node does not send the first broadcast acknowledgement packet.

Operation 203. The first node starts a first timer and a second timer.

Timing duration of the second timer is a second preset time period.

Specifically, in the prior art, neighboring nodes that receive the first broadcast data packet simultaneously forward the first broadcast data packet, thereby causing a packet collision and a resource waste. To avoid this case, in this embodiment of this application, all nodes that receive the first broadcast data packet are required to delay for a period of time before randomly forwarding the first broadcast data packet. In other words, when the second preset time period elapses, a sending occasion is randomly selected to forward the first broadcast data packet. This prevents neighboring nodes from usually forwarding a packet simultaneously, thereby mitigating a packet storm to some extent.

Further, the second preset time period may be set based on the quantity of subnodes of the first node. Optionally, the duration of the second preset time period is inversely proportional to the quantity of subnodes of the first node. To be specific, a larger quantity of subnodes indicates a shorter second preset time period and earlier forwarding of the first broadcast data packet by the first node. A reason for such a setting is as follows: Only after receiving acknowledgements, sent by all subnodes for the first broadcast data packet, the first node cancels forwarding the first broadcast data packet. Therefore, a larger quantity of subnodes of the first node indicates a higher probability that the first broadcast data packet needs to be forwarded, and a shorter delay time period. For example, if the quantity of subnodes is 3, the second preset time period may be set to 20 ms. If the quantity of subnodes is 1, the second preset time period may be set to 40 ms.

It should be noted that the second preset time period is usually less than the first preset time period. The first timer and the second timer may be started at the same time, or the second timer may be started before the first timer.

Operation 204. The first node determines whether the first broadcast data packet needs to be forwarded when a second preset time period of the second timer elapses.

Further, if the first node receives, within the second preset time period, a second acknowledgement indication, sent by any one subnode of the first node for the first broadcast data packet, it indicates that a subnode of the first node has received the first broadcast data packet, and therefore the first node no longer needs to forward the first broadcast data packet to its subnodes. The second acknowledgement indication includes an address of the first node and the sequence number of the first broadcast data packet. Therefore, when the first preset time period elapses, the first node needs to determine whether an acknowledgement needs to be sent to a parent node. In other words, operations 103 and 104 continue to be performed. It should be noted that the first broadcast acknowledgement packet sent by the first node at that time does not include a data field.

If the first node does not receive the second acknowledgement indication, sent by any one subnode for the first broadcast data packet, operation 205 is performed.

It should be noted that the second acknowledgement indication sent by the subnode of the first node may be included in a broadcast data packet or may be included in a broadcast ACK packet. If the any one subnode does not need to forward the first broadcast data packet, the second acknowledgement indication sent by the any one subnode is included in a broadcast ACK packet. If the any one subnode needs to forward the first broadcast data packet, the second acknowledgement indication sent by the any one subnode is included in a broadcast data packet. Specifically, if the second acknowledgement indication is included in a broadcast data packet shown in FIG. 2, a SeqNo field in the second acknowledgement indication is the same as the sequence number of the first broadcast data packet, and content of a data field in the second acknowledgement indication is the same as content of a data field in the first broadcast data packet. If the second acknowledgement indication is included in a broadcast ACK packet shown in FIG. 3, a SeqNo field in the second acknowledgement indication is the same as the sequence number of the first broadcast data packet.

Operation 205. The first node forwards the first broadcast data packet when the second preset time period elapses.

Specifically, after starting the second timer, the first node obtains a subnode list. The subnode list is used to record whether the first node receives a second acknowledgement indication, sent by each subnode for the first broadcast data packet. It should be noted that the first broadcast data packet forwarded by the first node includes an Address for ACK field and the data field. The Address for ACK field is the address of the second node. In other words, the first broadcast data packet includes the first acknowledgement indication. Therefore, when receiving the forwarded first broadcast data packet, the second node may determine that the first node has successfully received the first broadcast data packet.

Operation 206. The first node starts a third timer.

Duration of the third timer is a third preset time period, and the third preset time period is greater than the first preset time period.

Operation 207. The first node determines whether to retransmit the first broadcast data packet when a third preset time period of the third timer elapses.

In one embodiment, if the first node receives, within the third preset time period, a third acknowledgement indication, sent by any one subnode of the first node for the first broadcast data packet of the first node, the first node determines to skip retransmitting the first broadcast data packet, where the third acknowledgement indication includes the address of the first node and the sequence number of the first broadcast data packet. If the first node does not receive, within the third preset time period, a third acknowledgement indication, sent by any one subnode of the first node for the first broadcast data packet of the first node, operation 208 is performed, to ensure that all subnodes of the first node receive the first broadcast data packet.

The third acknowledgement indication may be included in a broadcast data packet, or may be included in a broadcast ACK packet. In other words, if the first node neither receives a broadcast data packet including the third acknowledgement indication nor receives a broadcast ACK packet including the third acknowledgement indication, the first node re-forwards the first broadcast data packet. If the first node receives a broadcast data packet including the third acknowledgement indication or receives a broadcast ACK packet including the third acknowledgement indication, the first node determines to skip retransmitting the first broadcast data packet. Specifically, if the third acknowledgement indication is included in a broadcast data packet shown in FIG. 2, a SeqNo field in the third acknowledgement indication is the same as the sequence number of the first broadcast data packet, an Address for ACK field in the third acknowledgement indication is the address of the first node, and content of a data field in the third acknowledgement indication is the same as the content of the data field in the first broadcast data packet. If the third acknowledgement indication is included in a broadcast ACK packet shown in FIG. 3, a SeqNo field in the third acknowledgement indication is the same as the sequence number of the first broadcast data packet, and an Address for ACK field is the address of the first node.

Operation 208. The first node retransmits the first broadcast data packet when the third preset time period elapses.

Therefore, in this embodiment of this application, when the first node delays, depending on the quantity of subnodes, forwarding the first broadcast data packet in different cases, the first node determines, before the forwarding, whether the third acknowledgement indication, sent by any one subnode of the first node for the first broadcast data packet is received. If the third acknowledgement indication is received, the first node skips retransmitting the first broadcast data packet to the subnode.

It should be noted that, when forwarding the first broadcast data packet, the first node adds an address of an acknowledgement sender to the Address for ACK field, so that the first node completes acknowledgement to a sending node while forwarding the first broadcast data packet. This greatly reduces a quantity of forwarded data packets and a quantity of acknowledgement packets in the network. In addition, a retransmission mechanism is further introduced in this embodiment of this application. When no subnode sends an acknowledgement indication, a sending node retransmits the broadcast packet when the third timer expires, thereby helping improve reliability of forwarding a broadcast packet by a node.

Figure 7:
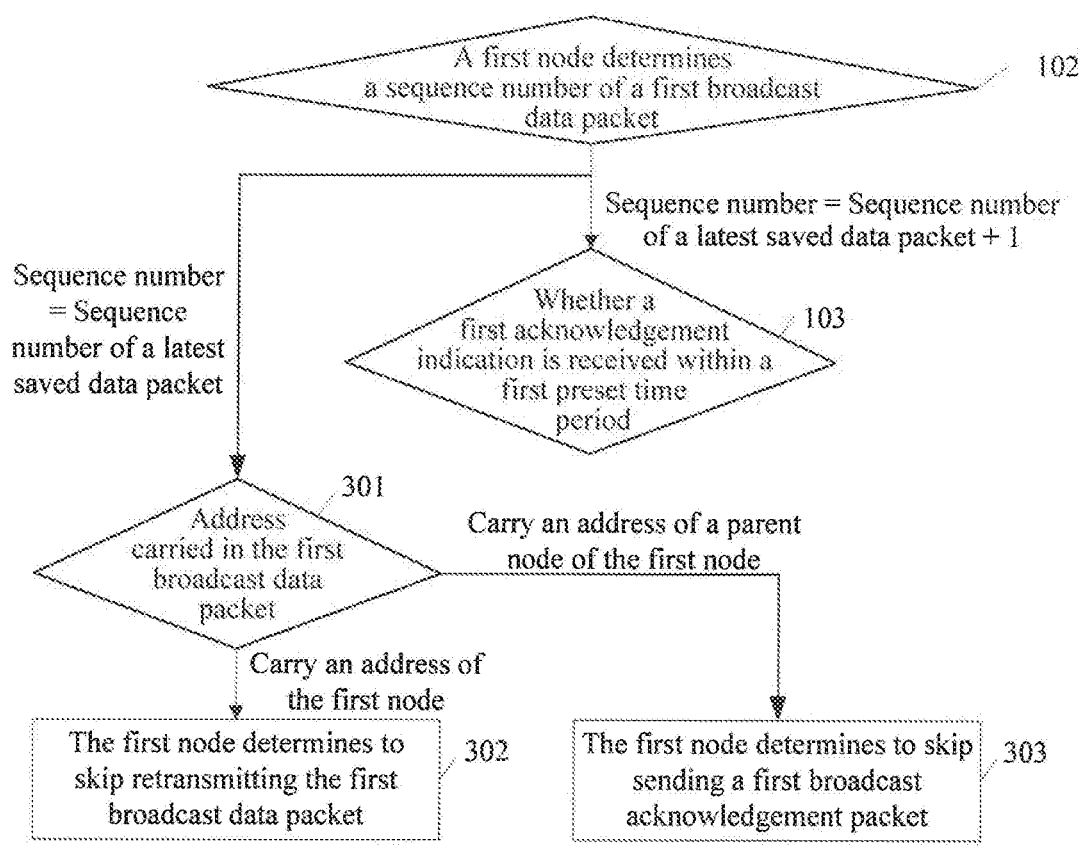
FIG. 7 is a flowchart of still another packet sending method according to an embodiment of this application.

Further, after operation 102, if the sequence number of the first broadcast data packet equals the sequence number of the latest data packet saved by the first node, it indicates that the first node has previously received the first broadcast data packet. Then, as shown in FIG. 7, an embodiment of this application further provides another packet sending method. The following operations are specifically included.

Operation 301. A first node determines whether a first broadcast data packet carries an address of the first node or an address of a parent node of the first node.

Specifically, the determining is performed based on a value of an Address for ACK field carried in the first broadcast data packet. If the value of the Address for ACK field is the address of the first node, it indicates that the first broadcast data packet is used as an acknowledgement to the first node. Then, operation 302 is performed. If the value of the Address for ACK field is the address of the parent node of the first node, it indicates that the first broadcast data packet is used as an acknowledgement to the parent node of the first node. Then, operation 303 is performed.

Operation 302. The first node determines to skip retransmitting the first broadcast data packet.

Specifically, if the first broadcast data packet is used as an acknowledgement to the first node, the first broadcast data packet is a first broadcast data packet forwarded by a subnode of the first node. Such a case indicates that the first broadcast data packet forwarded by the first node has been received by the subnode of the first node, and therefore the first node no longer needs to retransmit the first broadcast data packet.

Operation 303. The first node determines to skip sending the first broadcast acknowledgement packet.

Specifically, if the first broadcast data packet is used as an acknowledgement to the parent node of the first node, the first broadcast data packet is a first broadcast data packet forwarded by a neighboring node of the first node. After receiving the packet, the parent node of the first node may learn that the first broadcast data packet has been received by a subnode. Therefore, the first node may no longer need to perform acknowledgement to the parent node for the first broadcast data packet.

Figure 8:
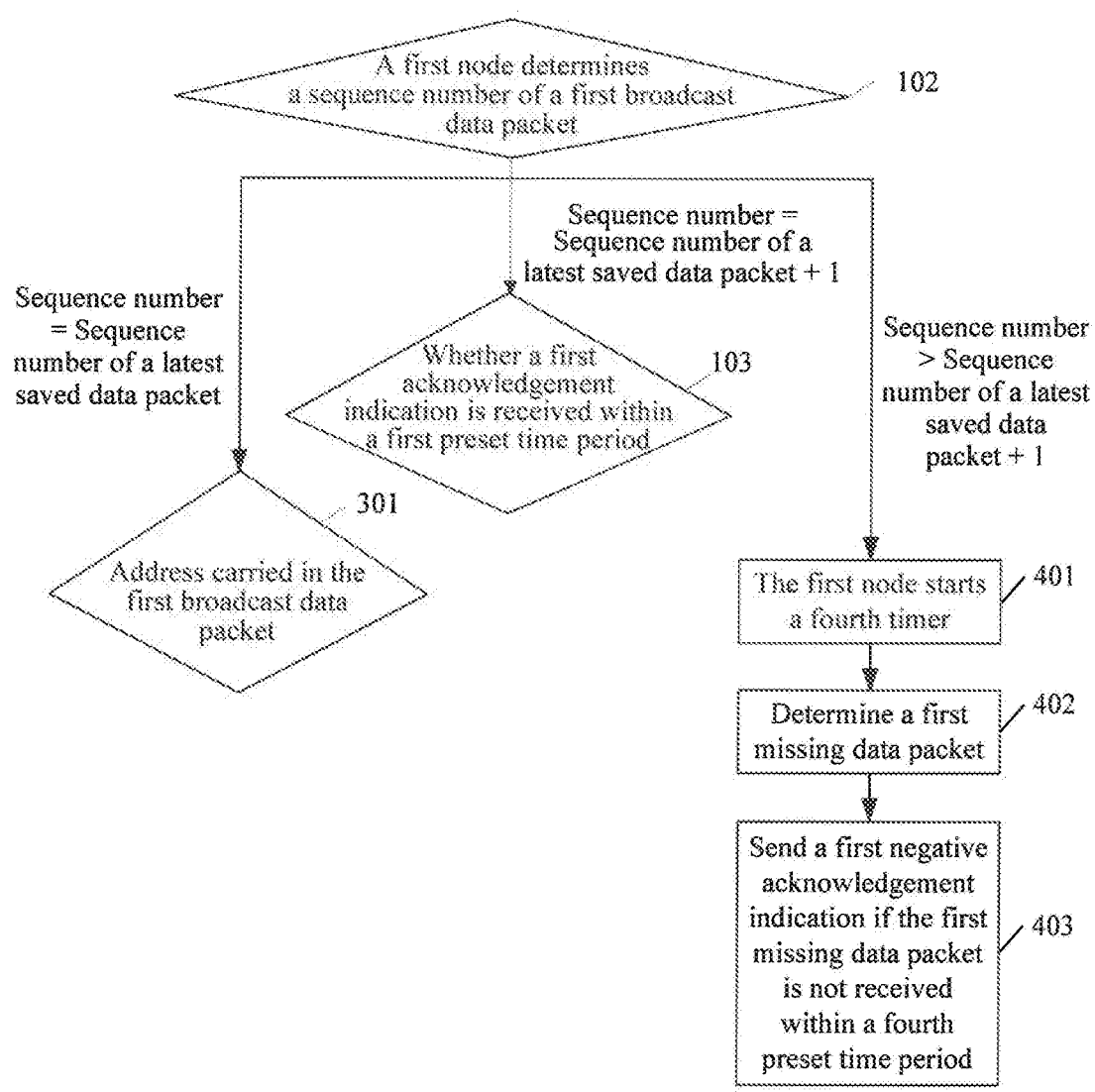
FIG. 8 is a flowchart of yet another packet sending method according to an embodiment of this application.

After operation 102, if the sequence number of the first broadcast data packet is greater than 1 plus the sequence number of the latest data packet saved by the first node, the first node may have a missing data packet. Then, to further improve reliability of packet forwarding by a node, as shown in FIG. 8, an embodiment of this application further provides a mechanism for retransmitting a missing data packet. The following operations are specifically included.

Operation 401. A first node starts a fourth timer.

Timing duration of the fourth timer is a fourth preset time period, and the first node determines, within the fourth preset time period, whether to send a NACK. It should be noted that when the first node finds that a data packet is missing, a reason may be that the missing data packet has not arrived at the first node yet and the first node may receive the missing data packet later than another node. In this case, the first node first starts the fourth timer, to determine whether the missing data packet can be received within the fourth preset time period.

Operation 402. The first node determines that a data packet whose sequence number is between 1 plus the sequence number of the latest data packet saved by the first node and the sequence number of the first broadcast data packet is a first missing data packet.

Operation 403. If the first node does not receive the first missing data packet within a fourth preset time period, the first node sends a first negative acknowledgement indication to a parent node of the first node when the fourth preset time period elapses.

The first negative acknowledgement indication includes the sequence number of the first missing data packet.

In one embodiment, if the first node does not receive the missing data packet within the fourth preset time period, the first node sends a NACK to the parent node of the first node, to request the parent node to send the missing data packet. If the parent node locally stores these missing data packets, the parent node directly sends the missing data packet to the first node in a unicast or a broadcast manner. If the parent node does not locally store these missing data packets, the parent node forwards the NACK to a gateway device hop by hop, to request the gateway device to forward the missing data packet to the first node hop by hop.

In this way, when there is a missing number between a sequence number of a broadcast packet received by the first node and a locally stored sequence number of a data packet, the first node may determine that a data packet is missing on the node, and when the missing data packet is not received within the fourth preset time period, further requests the parent node to retransmit the missing data packet. Therefore, reliability of packet forwarding is improved.

Figure 9:
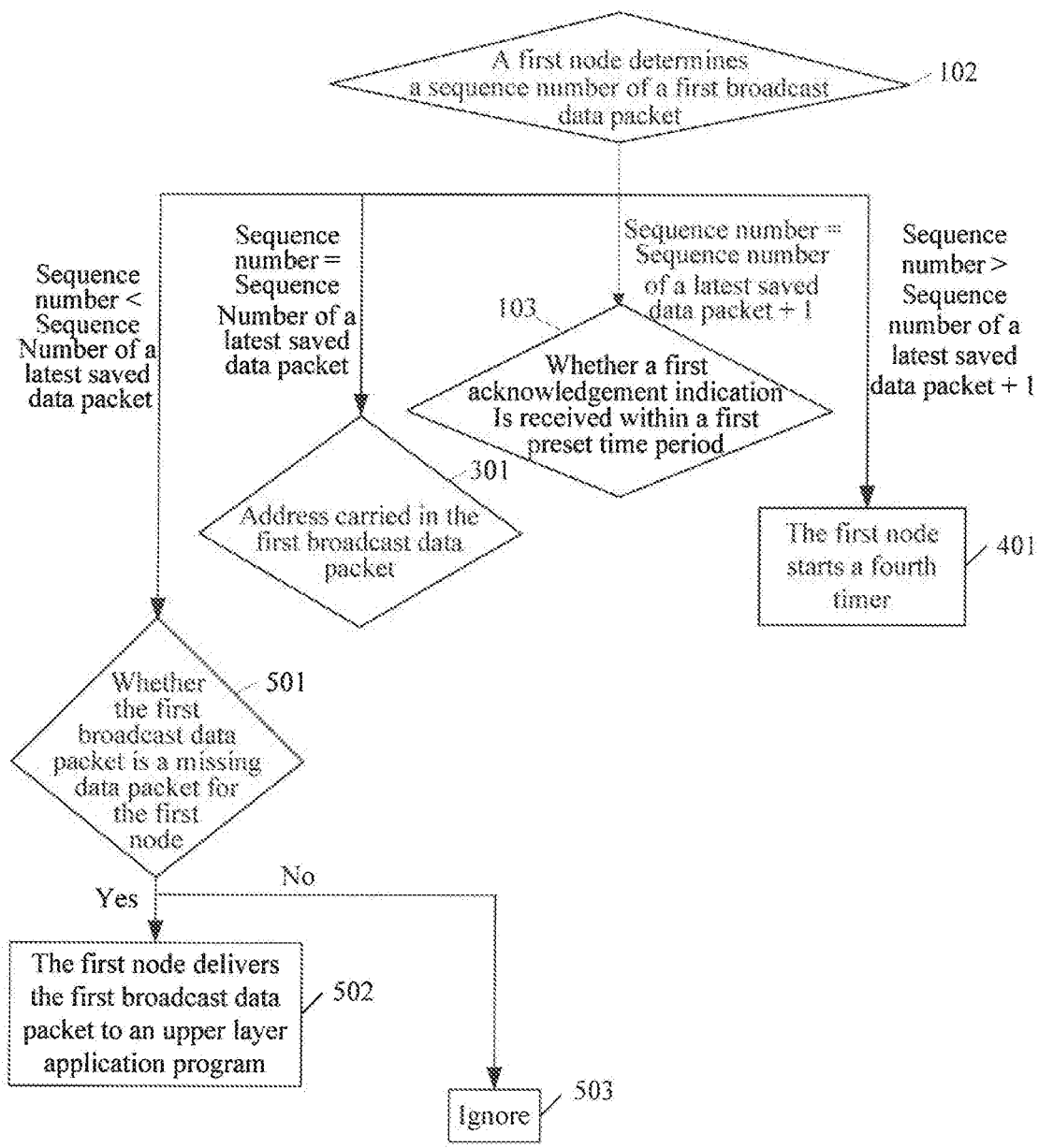
FIG. 9 is a flowchart of still yet another packet sending method according to an embodiment of this application.

Further, as shown in FIG. 9, after operation 102, if the sequence number of the first broadcast data packet is less than the sequence number of the latest data packet saved by the first node, a packet sending method provided in an embodiment of this application further includes the following operations.

Operation 501. A first node determines whether a first broadcast data packet is a missing data packet for the first node.

Specifically, if the first broadcast data packet is the missing data packet for the first node, operation 502 is performed. Otherwise, operation 503 is performed.

Operation 502. The first node delivers the first broadcast data packet to an upper layer application program for processing.

Specifically, if the sequence number of the first broadcast data packet is less than the sequence number of the latest data packet saved by the first node, the first broadcast data packet may be the missing data packet for the first node. Then, the first node delivers the first broadcast data packet to the upper layer application program, so that the upper layer application program processes the first broadcast data packet. If the sequence number of the first broadcast data packet is greater than the sequence number of the latest saved data packet minus a maximum quantity of data packets that can be stored by the first node, the first node further needs to store the first broadcast data packet, to ensure that the first node can directly retransmit the first broadcast data packet when a subnode requests to retransmit the first broadcast data packet. For example, it is assumed that the maximum quantity of data packets that can be stored by the first node is 5, and the sequence number of the latest data packet saved by the first node is 8. If the sequence number of the first broadcast data packet is greater than 3 and less than 8, the first node further needs to locally store the first broadcast data packet while delivering the first broadcast data packet to the upper layer application program. If the sequence number of the first broadcast data packet is less than 3, the first node merely needs to deliver the first broadcast data packet to the upper layer application program for processing.

Operation 503. The first node determines to skip processing the first broadcast data packet.

Specifically, if the first broadcast data packet is not the missing data packet for the first node, that is, if the first node has stored the first broadcast data packet, the first node ignores the first broadcast data packet.

Figure 10:
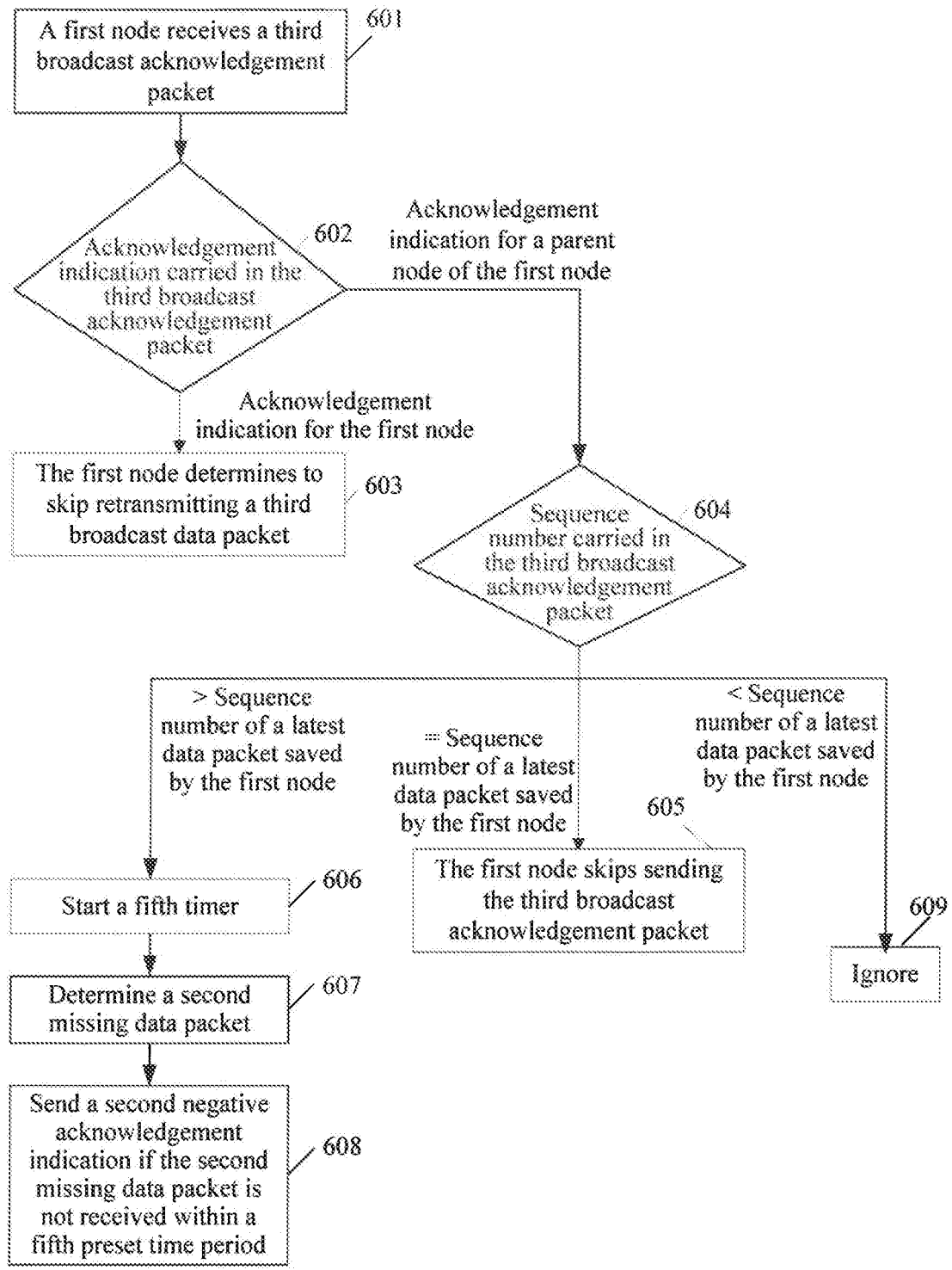
FIG. 10 is a flowchart of a further packet sending method according to an embodiment of this application.

Considering that the first node may receive a broadcast acknowledgement packet sent by a second node, an embodiment of this application further includes a packet sending method. As shown in FIG. 10, the following operations are specifically included.

Operation 601. A first node receives a third broadcast acknowledgement packet sent by a second node.

The third broadcast acknowledgement packet includes a sequence number of a third broadcast data packet and an address of a sending node of the third broadcast data packet.

Specifically, a SeqNo field in the third broadcast acknowledgement packet is the same as the sequence number of the third broadcast data packet. An Address for ACK field in the third broadcast acknowledgement packet is the address of the sending node of the third broadcast data packet.

Operation 602. The first node determines that the third broadcast acknowledgement packet is used as an acknowledgement to the first node or as an acknowledgement to a parent node of the first node.

Specifically, if the Address for ACK field in the third broadcast acknowledgement packet is an address of the first node, it indicates that the third broadcast acknowledgement packet is used as an acknowledgement for the third broadcast data packet of the first node. Then, operation 603 is performed. If the Address for ACK field in the third broadcast acknowledgement packet is an address of the parent node of the first node, it indicates that the third broadcast acknowledgement packet is used as an acknowledgement for the third broadcast data packet of the parent node of the first node. Then, operation 604 is performed.

Operation 603. The first node determines to skip retransmitting a third broadcast data packet.

For this operation, refer to operation 302. Details are not described herein again.

Operation 604. The first node compares a sequence number, carried in the third broadcast acknowledgement packet, of the third broadcast data packet with a sequence number of a latest data packet saved by the first node.

Specifically, if the sequence number of the third broadcast data packet equals the sequence number of the latest data packet saved by the first node, operation 605 is performed. If the sequence number of the third broadcast data packet is greater than the sequence number of the latest data packet saved by the first node, operation 606 is performed. If the sequence number of the third broadcast data packet is less than the sequence number of the latest data packet saved by the first node, operation 609 is performed.

Operation 605. The first node determines to skip sending the third broadcast acknowledgement packet to the parent node of the first node.

Specifically, if the sequence number of the third broadcast data packet equals the sequence number of the latest data packet saved by the first node, it indicates that the third broadcast acknowledgement packet is an acknowledgement indication from another node for the third broadcast data packet of the first node, and the first node does not need to send an acknowledgement indication for the third broadcast data packet of the first node, that is, the third broadcast acknowledgement packet.

Operation 606. The first node starts a fifth timer.

Timing duration of the fifth timer is a fifth preset time period, and the first node determines, within the fifth preset time period, whether to send a second negative acknowledgement indication. The second negative acknowledgement indication includes a data packet sequence number between the sequence number of the latest data packet saved by the first node and the sequence number of the third broadcast data packet.

Operation 607. The first node determines that a data packet whose sequence number is between 1 plus the sequence number of the latest data packet saved by the first node and the sequence number of the third broadcast data packet is a second missing data packet.

Operation 608. If the first node does not receive the second missing data packet within a fifth preset time period, the first node sends a second negative acknowledgement indication to the parent node of the first node.

The second negative acknowledgement indication includes the sequence number of the second missing data packet. When the first node finds that a data packet is missing, a reason may be that the missing data packet has not arrived at the first node yet and the first node may receive the missing data packet later than another node. In this case, the first node first starts the fifth timer, to determine whether the missing data packet can be received within the fifth preset time period of the fifth timer.

For this operation, refer to operation 403. Details are not described herein again.

Operation 609. The first node determines to skip processing the third broadcast acknowledgement packet.

In the embodiments of this application, for clearer understanding of an entire process of forwarding, acknowledging, and retransmitting a broadcast packet by all nodes in a network, the following provides a description with reference to the network topology in FIG. 1.

First, time in the entire process of forwarding, acknowledging, and retransmitting is specifically described as follows:

(1) It is assumed that a process in which a node sends a data packet to another node receives the data packet takes 5 ms.

(2) After receiving a data packet, a node needs to start a forwarding timer. The forwarding timer is equivalent to the second timer in the foregoing descriptions. When the forwarding timer expires, the node forwards the data packet. The forwarding timer may be set as follows: If a quantity of subnodes of the node is greater than 4, the forwarding timer is set to 0 ms; if the quantity of subnodes of the node is 3, the forwarding timer is set to 20 ms; if the quantity of subnodes of the node is 2, the forwarding timer is set to 40 ms; if the quantity of subnodes of the node is 1, the forwarding timer is set to 60 ms; or if the quantity of subnodes of the node is 0, forwarding is not performed.

(3) In addition, after receiving the data packet, the node further needs to start an ACK timer, and the ACK timer is equivalent to the first timer in the foregoing descriptions. When the ACK timer expires, the node returns an ACK to a sending node. The ACK timer may be set to 100 ms.

(4) After forwarding the data packet, the node further needs to start a 150-ms retransmission timer, and the retransmission timer is equivalent to the third timer in the foregoing descriptions. If the node does not receive, within 150 ms after the data packet is forwarded, an ACK returned by any one subnode, the node re-forwards the data packet.

With reference to FIGS. 11 to 14, the following describes a specific process of forwarding, acknowledging, and retransmitting a broadcast data packet.

Figure 11:
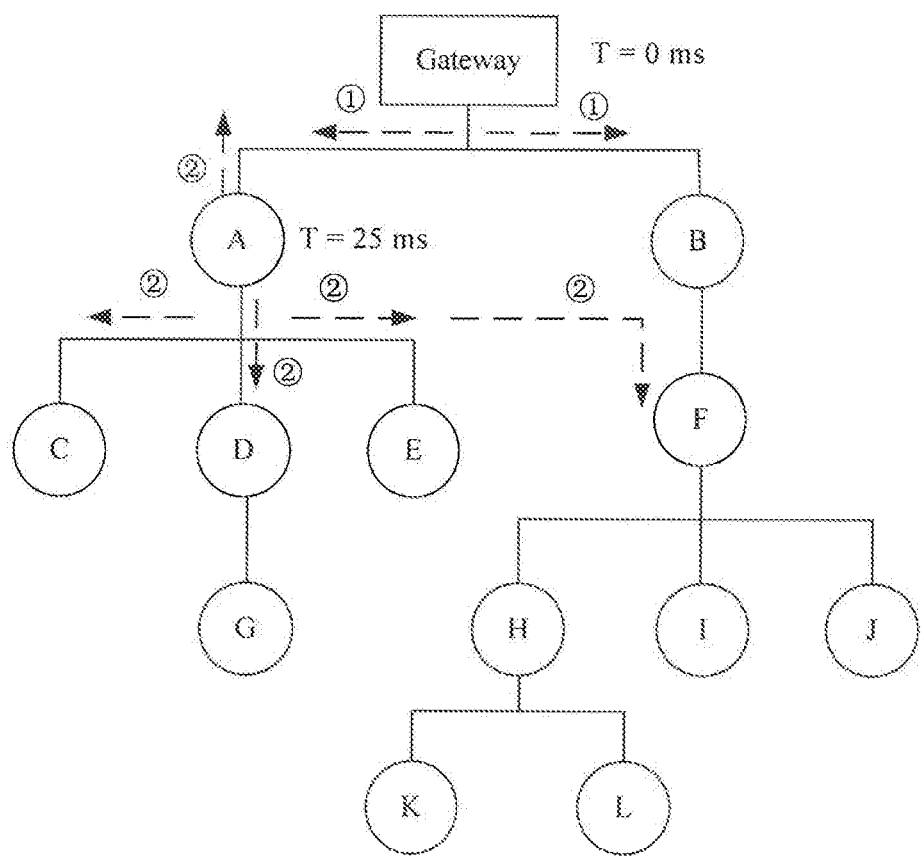
FIG. 11 is a schematic diagram of a packet sending method according to an embodiment of this application.

As shown in FIG. 11, at T=0 ms, a gateway device sends a first broadcast data packet to subnodes A and B (as shown by ① in the figure), and starts a 150-ms retransmission timer.

Both A and B receive the broadcast data packet at T=5 ms. A has three subnodes, and therefore A starts a 20-ms forwarding timer. B has one subnode, and therefore B starts a 60-ms forwarding timer.

A forwards the broadcast data packet to the gateway device, C, D, and E at T=25 ms (as shown by ② in the figure). The gateway device receives the broadcast data packet at T=30 ms, and therefore cancels retransmission.

C, D, and E all receive, at T=30 ms, the broadcast data packet forwarded by A. D has one subnode, and therefore D starts a 60-ms forwarding timer and starts an ACK timer. Neither C nor E has a subnode, and therefore C and E do not forward the broadcast data packet but each start an ACK timer.

It is assumed that F also receives, at T=30 ms, the broadcast data packet forwarded by A. F has three subnodes, and therefore starts a 20-ms forwarding timer.

Figure 12:
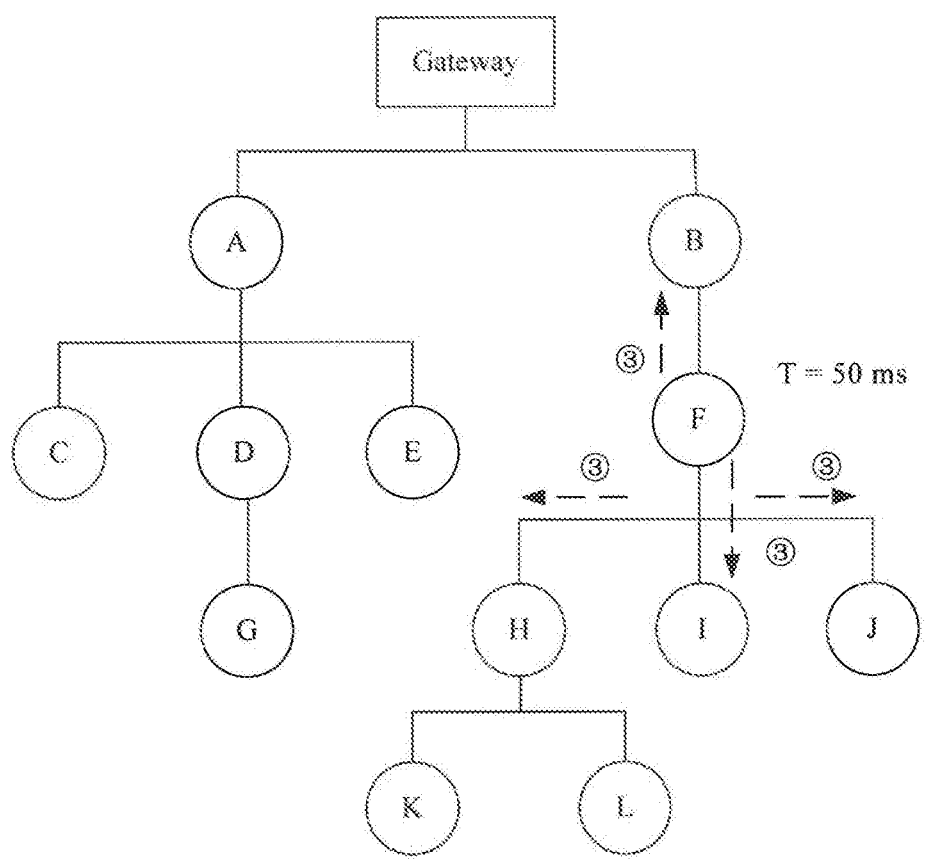
FIG. 12 is a schematic diagram of another packet sending method according to an embodiment of this application.

As shown in FIG. 12, F forwards the broadcast data packet to B, H, I, and J at T=50 ms (as shown by ③ in the figure), and B receives, at T=55 ms, the broadcast data packet forwarded by F. However, B originally plans to perform forwarding at T=65 ms (B receives, at T=5 ms, a broadcast data packet sent by the gateway device and starts a 60-ms forwarding timer). Therefore, B cancels forwarding. At the same time, H, I, and J all receive the broadcast data packet at T=55 ms and each start an ACK timer. H has two subnodes, and therefore H starts a 40-ms forwarding timer. Neither I nor J has a subnode, and therefore I and J do not forward the broadcast data packet but each start an ACK timer.

Figure 13:
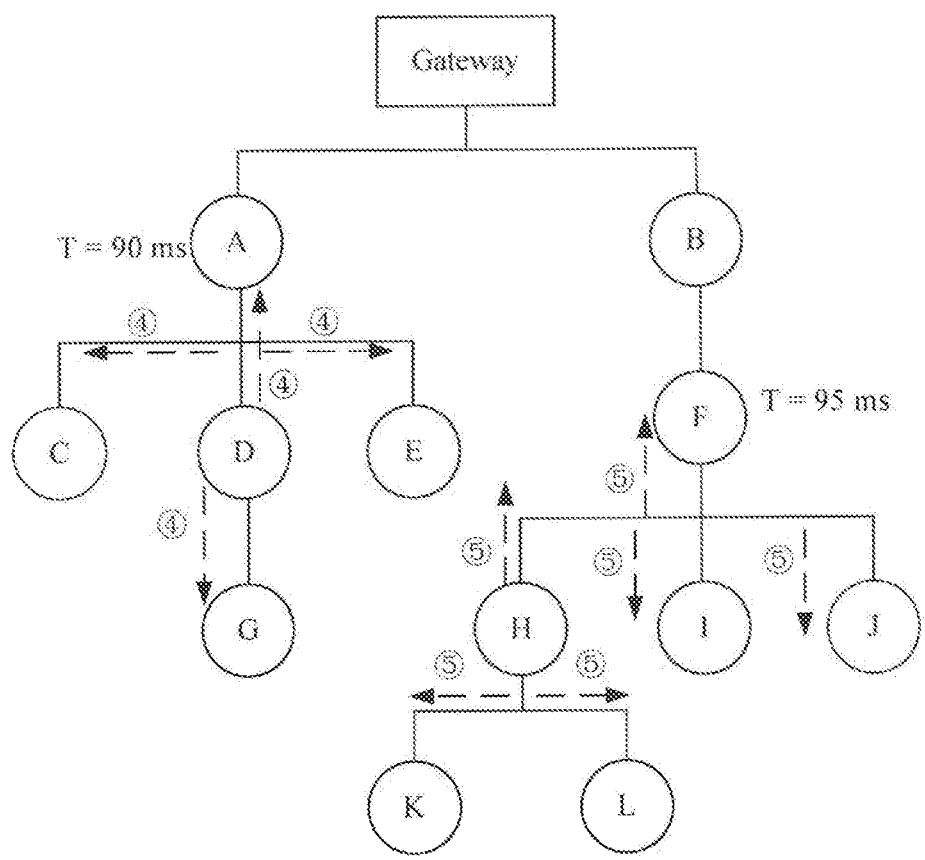
FIG. 13 is a schematic diagram of still another packet sending method according to an embodiment of this application.

As shown in FIG. 13, D forwards the broadcast data packet to A, C, E, and G at T=90 ms (as shown by ④ in the figure), and A receives the broadcast data packet at T=95 ms and cancels retransmission. After receiving the broadcast data packet at T=95 ms, C and E cancel returning an ACK. G starts an ACK timer.

H forwards the broadcast data packet to F, I, J, K, and J (as shown by ⑤ in the figure) when a forwarding timer expires at T=95 ms. After receiving the broadcast data packet at T=100 ms, F cancels retransmission. After receiving the broadcast data packet, I and J cancel returning an ACK. After receiving the broadcast data packet, K and L each start an ACK timer.

Figure 14:
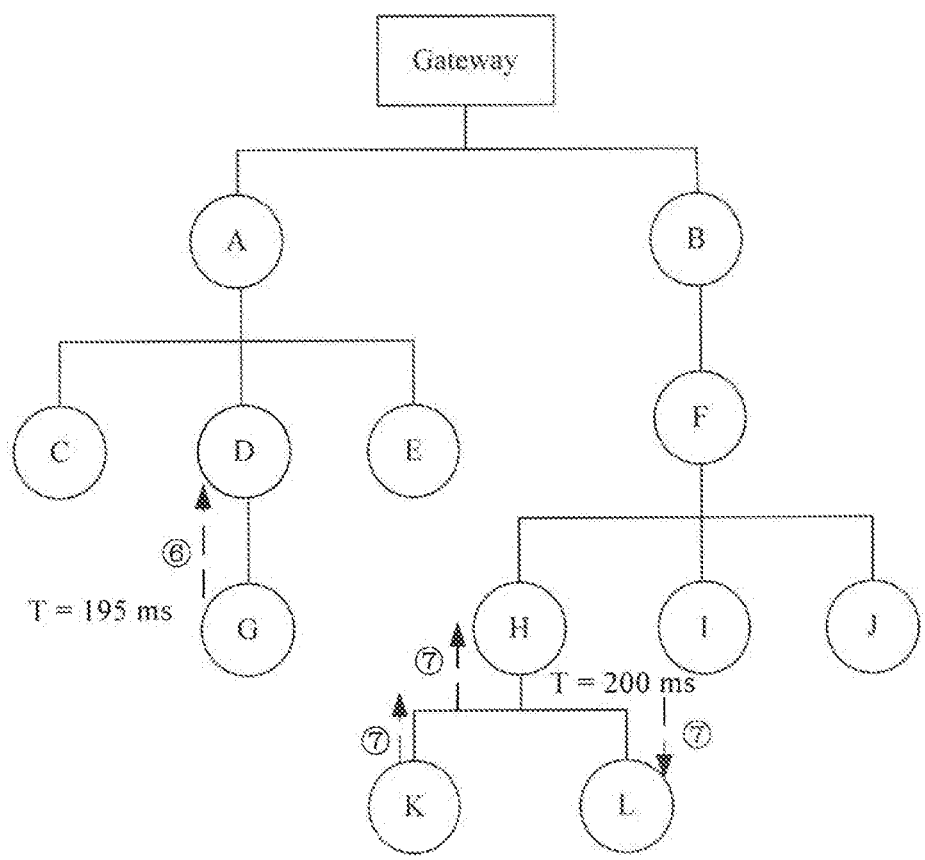
FIG. 14 is a schematic diagram of yet another packet sending method according to an embodiment of this application.

As shown in FIG. 14, G returns an ACK to D at T=195 ms (as shown by ⑥ in the figure) when an ACK timer expires. K returns an ACK to H (as shown by ⑦ in the figure) when an ACK timer expires at T=200 ms. After receiving the ACK packet, H cancels retransmission at T=205 ms. In addition, after receiving the ACK packet, L cancels returning an ACK.

In conclusion, there are a total of 12 nodes in the network, and in a case of no packet loss, only four nodes, namely, A, D, F, and H, forward the broadcast data packet, and two nodes, namely, G and K, return an ACK. Compared with the prior art in which all intermediate nodes need to forward a broadcast data packet and returns an ACK, in the broadcast data packet forwarding method in the embodiments of this application, quantities of broadcast data packets and ACKs that are forwarded in a network are reduced and network resource are saved on a premise that reliability of broadcast data packet transmission is ensured.

The foregoing mainly describes, from a perspective of interaction between various network devices, the solutions provided in the embodiments of this application. It can be understood that, to implement the foregoing functions, the network devices include corresponding hardware structures and/or software modules executing the functions. A person of ordinary skill in the art should easily be aware that, with reference to units and algorithms operations of the examples described in the embodiments disclosed in this specification, the present invention can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present invention.

In the embodiments of this application, the network device may be divided into functional modules according to the foregoing method example. For example, various functional modules corresponding to various functions may be obtained through division, or two or more functions are integrated into one processing module. The integrated module may be implemented in a form of hardware, or may be implemented in a form of a software functional module. It should be noted that the module division in the embodiments of this application is an example, and is merely logical function division and may be other division in actual implementation.

Figure 15:
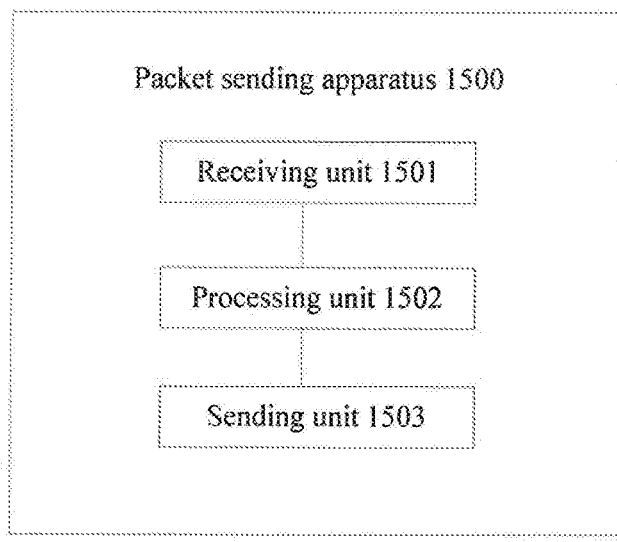
FIG. 15 is a schematic structural diagram of a packet sending apparatus according to an embodiment of this application.

When division of functional modules is corresponding to functions, FIG. 15 shows a schematic diagram of a possible structure of a packet sending apparatus according to the foregoing embodiments. The packet sending apparatus 1500 includes a receiving unit 1501, a processing unit 1502, and a sending unit 1503. The receiving unit 1501 is configured to support a network device in executing operation 101 in FIG. 5. The processing unit 1502 is configured to support the network device in executing operations 102 and 103 in FIG. 5, operations 201 to 204 and operations 206 and 207 in FIG. 6, operations 301 to 303 in FIG. 7, operations 401 and 402 in FIG. 8, operations 501 and 503 in FIG. 9, and operations 601 to 606 and operation 608 in FIG. 10. The sending unit 1503 is configured to support the network device in executing operation 104 in FIG. 5, operations 205 and 208 in FIG. 6, operation 403 in FIG. 8, operation 502 in FIG. 9, and operation 607 in FIG. 10. For all the related content of various operations according to the foregoing method embodiments, refer to the function descriptions of corresponding function modules. Details are not described herein again.

The packet sending apparatus 1500 may be a node shown in FIG. 1. Specifically, the receiving unit 1501 and the sending unit 1503 may be integrated together to be a communications module.

Figure 16:
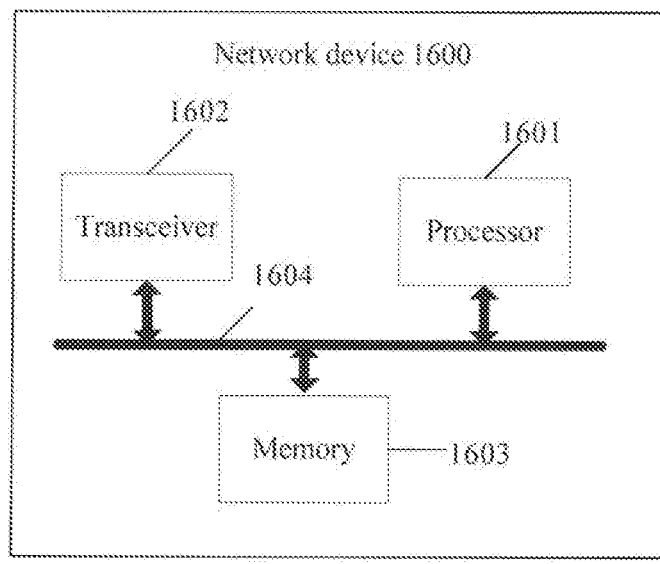
FIG. 16 is a schematic structural diagram of a packet sending device according to an embodiment of this application.

When the receiving unit 1501 and the sending unit 1503 are integrated into a transceiver, and the processing unit 1502 is a processor, the device according to this embodiment of this application may further be a network device shown in FIG. 16.

FIG. 16 shows a schematic structural diagram of a network device 1600 according to the foregoing embodiments. The network device 1600 includes a processor 1601, a transceiver 1602, a memory 1603, and a bus 1604. The transceiver 1602, the processor 1601, and the memory 1603 are connected to each other by using the bus 1604. The bus may be classified into an address bus, a data bus, a control bus, and the like. For ease of representation, only one thick line is used to represent the bus in FIG. 16, but this does not mean that there is only one bus or only one type of bus.

The network device 1600 further includes an antenna. The antenna may be independently disposed or may be integrated into the transceiver 1602. For example, in FIG. 16, the antenna is integrated into the transceiver 1602.

The memory 1603 is configured to store information such as the broadcast data packet, the sequence number, the first preset time period, and the second preset time period that are in the foregoing methods.

Operations of methods or algorithms described with reference to the content disclosed in the present invention may be implemented by hardware, or may be implemented by executing, by the processor 1601, a program instruction stored in the memory 1603. The processor 1601 may be, for example, any one or any combination of a central processing unit (CPU), a network processor (NP), a general purpose processor, and a digital signal processor (DSP). The processor 1601 may further include an application-specific integrated circuit (ASIC), a field programmable gate array (FPGA), or another programmable logic device, a transistor logic device, a hardware component, or any combination thereof. The memory 1603 may include a volatile memory, such as a random access memory (RAM). The memory 1603 may also include a nonvolatile memory, such as a flash memory, a hard disk drive (HDD), or a solid state drive (SSD). The memory 1603 may also include a combination of the foregoing types of memories. It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

When the functions are implemented in the form of a software functional unit and sold or used as an independent product, the functions may be stored in a computer readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the operations of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement within the technical scope disclosed in this application shall fall within the protection scope of this application.

What is claimed is:

1. A packet sending method, comprising:
   receiving, by a first node, a first broadcast data packet sent by a second node; and
   if a sequence number of the first broadcast data packet equals 1 plus a sequence number of a latest data packet saved by the first node, and the first node does not receive, within a first preset time period, a first acknowledgement indication for the first broadcast data packet of the second node, sending, by the first node, a first broadcast acknowledgement packet when the first preset time period elapses, wherein the first broadcast acknowledgement packet comprises the first acknowledgement indication, and the first acknowledgement indication comprises the sequence number of the first broadcast data packet and an address of the second node.

2. The method according to claim 1, further comprising:
   starting, by the first node, a first timer and a second timer if the first node has a subnode, wherein timing duration of the first timer is the first preset time period, timing duration of the second timer is a second preset time period, and the second preset time period is less than the first preset time period; and
   if the first node does not receive, within the second preset time period, a second acknowledgement indication, sent by any one subnode of the first node for the first broadcast data packet, sending, by the first node, the first broadcast data packet when the second preset time period elapses.

3. The method according to claim 2, wherein the second preset time period is inversely proportional to a quantity of subnodes of the first node.

4. The method according to claim 2, further comprising:
starting, by the first node, a third timer when the first node sends the first broadcast data packet, wherein timing duration of the third timer is a third preset time period, and the third preset time period is greater than the first preset time period; and
if the first node does not receive, within the third preset time period, a third acknowledgement indication for the first broadcast data packet of the first node, retransmitting, by the first node, the first broadcast data packet when the third preset time period elapses.

5. The method according to claim 1, wherein in determining that the first node does not receive, within a first preset time period, a first acknowledgement indication for the first broadcast data packet of the second node, the method comprises:
determining, by the first node, that at least one of a second broadcast data packet and a second broadcast acknowledgement packet is not received within the first preset time period, wherein the second broadcast data packet comprises a data field and the first acknowledgement indication, and the second broadcast acknowledgement packet comprises the first acknowledgement indication.

6. The method according to claim 1, further comprising:
if a sequence number of the first broadcast data packet equals a sequence number of a latest data packet saved by the first node, and the first broadcast data packet carries an address of the first node, determining, by the first node, to skip retransmitting the first broadcast data packet; or if a sequence number of the first broadcast data packet equals a sequence number of a latest data packet saved by the first node, and the first broadcast data packet carries an address of a parent node of the first node, determining, by the first node, to skip sending the first broadcast acknowledgement packet.

7. The method according to claim 1, further comprising:
if a sequence number of the first broadcast data packet is greater than 1 plus a sequence number of a latest data packet saved by the first node, determining, by the first node, that a data packet whose sequence number is between 1 plus the sequence number of the latest data packet saved by the first node and the sequence number of the first broadcast data packet is a first missing data packet, and starting a fourth timer, wherein timing duration of the fourth timer is a fourth preset time period; and
if the first node does not receive the first missing data packet within the fourth preset time period, sending, by the first node, a first negative acknowledgement indication to a parent node of the first node, wherein the first negative acknowledgement indication comprises the sequence number of the first missing data packet, so as to instruct the parent node of the first node to send the first missing data packet.

8. The method according to claim 1, further comprising:
receiving, by the first node, a third broadcast acknowledgement packet sent by the second node, wherein the third broadcast acknowledgement packet comprises a sequence number of a third broadcast data packet and an address of a sending node of the third broadcast data packet;

if the third broadcast acknowledgement packet is used as an acknowledgement to the first node, determining, by the first node, to skip retransmitting the third broadcast data packet; or if the third broadcast acknowledgement packet is used as an acknowledgement to a parent node of the first node, comparing, by the first node, the sequence number of the third broadcast data packet with the sequence number of the latest data packet saved by the first node;
if the sequence number of the third broadcast data packet equals the sequence number of the latest data packet saved by the first node, determining, by the first node, to skip sending the third broadcast acknowledgement packet; or if the sequence number of the third broadcast data packet is greater than the sequence number of the latest data packet saved by the first node, determining, by the first node, that a data packet whose sequence number is between 1 plus the sequence number of the latest data packet saved by the first node and the sequence number of the third broadcast data packet is a second missing data packet, and starting a fifth timer, wherein timing duration of the fifth timer is a fifth preset time period; and
if the first node does not receive the second missing data packet within the fifth preset time period, sending, by the first node, a second negative acknowledgement indication to the parent node of the first node, wherein the second negative acknowledgement indication comprises the sequence number of the second missing data packet, so as to instruct the parent node of the first node to send the second missing data packet.

9. A packet sending apparatus used in a first node, comprising:
a receiving unit, configured to receive a first broadcast data packet sent by a second node; and
a sending unit, configured to: if a sequence number of the first broadcast data packet received by the receiving unit equals 1 plus a sequence number of a latest data packet saved by the first node, and the receiving unit does not receive, within a first preset time period, a first acknowledgement indication for the first broadcast data packet of the second node, send a first broadcast acknowledgement packet when the first preset time period elapses, wherein the first broadcast acknowledgement packet comprises the first acknowledgement indication, and the first acknowledgement indication comprises the sequence number of the first broadcast data packet and an address of the second node.

10. The apparatus according to claim 9, further comprising a processing unit configured to start a first timer and a second timer if the first node has a subnode, wherein timing duration of the first timer is the first preset time period, timing duration of the second timer is a second preset time period, and the second preset time period is less than the first preset time period; and
wherein the sending unit is configured to: if the receiving unit does not receive, within the second preset time period, a second acknowledgement indication, sent by any one subnode of the first node for the first broadcast data packet, send the first broadcast data packet when the second preset time period elapses.

11. The apparatus according to claim 10, wherein the second preset time period is inversely proportional to a quantity of subnodes of the first node.

12. The apparatus according to claim 10, wherein the processing unit is further configured to start a third timer when the sending unit sends the first broadcast data packet, wherein timing duration of the third timer is a third preset time period, and the third preset time period is greater than the first preset time period; and the sending unit is further configured to: if the receiving unit does not receive, within the third preset time period, a third acknowledgement indication for the first broadcast data packet of the first node, retransmit the first broadcast data packet when the third preset time period elapses.

13. The apparatus according to claim 10, wherein the processing unit is further configured to determine that the receiving unit does not receive, within the first preset time period, at least one of a second broadcast data packet and a second broadcast acknowledgement packet, wherein the second broadcast data packet comprises a data field and the first acknowledgement indication, and the second broadcast acknowledgement packet comprises the first acknowledgement indication.

14. The apparatus according to claim 10, wherein the processing unit is further configured to: if a sequence number of the first broadcast data packet equals a sequence number of a latest data packet saved by the first node, and the first broadcast data packet carries an address of the first node, determine to skip retransmitting the first broadcast data packet; or the processing unit is further configured to: if a sequence number of the first broadcast data packet equals a sequence number of a latest data packet saved by the first node, and the first broadcast data packet carries an address of a parent node of the first node, determine to skip sending the first broadcast acknowledgement packet.

15. The apparatus according to claim 10, wherein the processing unit is further configured to: if a sequence number of the first broadcast data packet is greater than 1 plus a sequence number of a latest data packet saved by the first node, determine that a data packet whose sequence number is between 1 plus the sequence number of the latest data packet saved by the first node and the sequence number of the first broadcast data packet is a first missing data packet, and start a fourth timer, wherein timing duration of the fourth timer is a fourth preset time period; and the sending unit is further configured to: if the receiving unit does not receive the first missing data packet within the fourth preset time period, send a first negative acknowledgement indication to a parent node of the first node, wherein the first negative acknowledgement indication comprises the sequence number of the first missing data packet, so as to instruct the parent node of the first node to send the first missing data packet.

16. The apparatus according to claim 9, wherein the receiving unit is further configured to receive a third broadcast acknowledgement packet sent by the second node, wherein the third broadcast acknowledgement packet comprises a sequence number of a third broadcast data packet and an address of a sending node of the third broadcast data packet;

the processing unit is further configured to: if the third broadcast acknowledgement packet is used as an acknowledgement to the first node, determine to skip retransmitting the third broadcast data packet; or the processing unit is further configured to: if the third broadcast acknowledgement packet is used as an acknowledgement to a parent node of the first node, compare the sequence number of the third broadcast data packet with the sequence number of the latest data packet saved by the first node;

the processing unit is further configured to: if the sequence number of the third broadcast data packet equals the sequence number of the latest data packet saved by the first node, determine to skip sending the third broadcast acknowledgement packet; or the processing unit is further configured to: if the sequence number of the third broadcast data packet is greater than the sequence number of the latest data packet saved by the first node, determine that a data packet whose sequence number is between 1 plus the sequence number of the latest data packet saved by the first node and the sequence number of the third broadcast data packet is a second missing data packet, and start a fifth timer, wherein timing duration of the fifth timer is a fifth preset time period; and the sending unit is further configured to: if the receiving unit does not receive the second missing data packet within the fifth preset time period, send a second negative acknowledgement indication to the parent node of the first node, wherein the second negative acknowledgement indication comprises the sequence number of the second missing data packet, so as to instruct the parent node of the first node to send the second missing data packet.

17. A packet sending device used as a first node in a wireless mesh network, comprising:

a transceiver is configured to:

receive a first broadcast data packet sent by a second node in the mesh network; and if a sequence number of the first broadcast data packet received by the transceiver equals 1 plus a sequence number of a latest data packet saved by a first node, and the transceiver does not receive, within a first preset time period, a first acknowledgement indication for the first broadcast data packet of the second node, send a first broadcast acknowledgement packet when the first preset time period elapses, wherein the first broadcast acknowledgement packet comprises the first acknowledgement indication, and the first acknowledgement indication comprises the sequence number of the first broadcast data packet and an address of the second node; and a processor is configured to:

start a first timer and a second timer if the first node has a subnode, where timing duration of the first timer is the first preset time period, timing duration of the second timer is a second preset time period, and the second preset time period is less than the first preset time period.

18. The device according to claim 17, wherein the transceiver is configured to:

if not receiving, within the second preset time period, a second acknowledgement indication from any subnode of the first node for the first broadcast data packet, send the first broadcast data packet when the second preset time period elapses.

19. The device according to claim 18, wherein the processor is further configured to:

start a third timer after the transceiver sends the first broadcast data packet, where timing duration of the third timer is a third preset time period, and the third preset time period is greater than the first preset time period; and the transceiver is further configured to:

if not receiving, within the third preset time period, a third acknowledgement indication for the first broadcast data packet of the first node, retransmit the first broadcast data packet when the third preset time period elapses.

20. The device according to claim 17, wherein the processor is configured to:

skip sending the first broadcast acknowledgement packet when a sequence number of the first broadcast data packet equals a sequence number of a latest data packet saved by the first node, and the first broadcast data packet carries an address of a parent node of the first node;

skip retransmitting the first broadcast data packet when a sequence number of the first broadcast data packet equals a sequence number of a latest data packet saved by the first node, and the first broadcast data packet carries an address of the first node.

\* \* \* \* \*